(12) United States Patent
Takagi et al.

(10) Patent No.: US 6,700,966 B2
(45) Date of Patent: *Mar. 2, 2004

(54) SYSTEM, APPARATUS AND METHOD FOR PROCESSING CALLS BASED ON PLACE DETECTION OF MOVING PERSONNEL OR OBJECTS

(75) Inventors: Tsuneyoshi Takagi, Kawasaki (JP); Kenichiro Tanaka, Kawasaki (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 101 days.

(21) Appl. No.: 09/104,007

(22) Filed: Jun. 24, 1998

(65) Prior Publication Data

US 2002/0048356 A1 Apr. 25, 2002

(30) Foreign Application Priority Data

Jun. 30, 1997 (JP) .............................................. 9/189053
Jun. 30, 1997 (JP) .............................................. 9/189055
May 8, 1998 (JP) ............................................ 10/142161

(51) Int. Cl.$^7$ ................................................ H04M 3/42
(52) U.S. Cl. ...................... 379/201.06; 379/38; 379/39; 379/56.3; 379/201.08; 379/201.09; 379/201.1
(58) Field of Search ........................... 379/37, 38, 56.3, 379/49, 211, 201.01, 201.06, 201.07, 201.08, 211.01, 211.02, 211.05

(56) References Cited

U.S. PATENT DOCUMENTS

| | | | | |
|---|---|---|---|---|
| 5,099,346 A | * | 3/1992 | Lee et al. | 359/118 |
| 5,197,092 A | * | 3/1993 | Bamburak | 379/211.05 |
| 5,455,851 A | * | 10/1995 | Chaco et al. | 379/38 |
| 5,533,113 A | * | 7/1996 | Ozawa et al. | 379/201.07 |
| 5,689,229 A | * | 11/1997 | Chaco et al. | 340/386.07 |
| 5,705,980 A | * | 1/1998 | Shapiro | 379/37 |
| 5,742,233 A | * | 4/1998 | Hoffman et al. | 340/573.1 |
| 6,023,503 A | * | 2/2000 | Schneider et al. | 379/188 |
| 6,191,702 B1 | * | 2/2001 | Ishida | 340/7.55 |

* cited by examiner

Primary Examiner—Harry S. Hong
Assistant Examiner—Bing Bui
(74) Attorney, Agent, or Firm—Fitzpatrick, Cella, Harper Scinto

(57) ABSTRACT

In ordinary telephones, a communication partner is called without considering the location of the communication partner and whether or not the communication partner is busy. In the present invention, it is determined whether or not the communication partner is to be called at least based on information relating the position of a communication apparatus possessed by the communication partner.

28 Claims, 28 Drawing Sheets

FIG.6

| NAME | USER ID | LEVEL |
|---|---|---|
| USER A | 0001 | 10 |
| USER B | 0002 | 0 |
| USER C | 0003 | 5 |
| ⋮ | ⋮ | ⋮ |

FIG.7

| NAME OF LOCATION | SENSOR ID | LEVEL |
|---|---|---|
| USER A'S DESK | 0001 | 0 |
| CONFERENCE ROOM 1 | 0002 | 7 |
| EXECUTIVE ROOM 1 | 0003 | 10 |
| ⋮ | ⋮ | ⋮ |

FIG.8

CALL FROM USER m TO USER n (NUMERAL REPRESENTING
    DETERMINATION OF CALL) =

(LEVEL OF USER m) − (LEVEL OF USER n)

+ (DEGREE OF EMERGENCY)

− (LEVEL OF LOCATION WHERE USER n IS PRESENT)

FIG.9

$$(\text{NUMERAL REPRESENTING DETERMINATION OF CALL}) \begin{cases} > 0 & \text{EXECUTION OF CALL} \\ = 0 & \text{WARNING} \\ > 0 & \text{INCAPABLE OF CALL} \end{cases}$$

FIG.20

| BADGE ID 1 | SENSOR ID m | TIME T1 |
|---|---|---|
| BADGE ID 2 | NULL | TIME T2 |
| BADGE ID 3 | SENSOR ID n | TIME T3 |
| ⋮ | ⋮ | ⋮ |

CONTACT

FIG.31

| NAME OF LOCATION | SENSOR ID | SENSOR POSITION | | |
|---|---|---|---|---|
| | | Floor | X (m) | Y (m) |
| USER B'S DESK | 0001 | 3 | 10 | 15 |
| CONFERENCE ROOM 1 | 0002 | 2 | 0 | 0 |
| COPY ROOM 1 | 0003 | 2 | 3 | 12 |
| ⋮ | ⋮ | ⋮ | ⋮ | ⋮ |

FIG.32

| NAME OF LOCATION | SENSOR ID | DISTANCE TO BE ADDED |
|---|---|---|
| CONFERENCE ROOM 1 | 0002 | 10 |
| CONFERENCE ROOM 2 | 0007 | 15 |
| EXECUTIVE ROOM 1 | 00013 | 100 |
| ⋮ | ⋮ | ⋮ |

FIG.33

|  | MOVEMENT LOAD (POINTS) |
|---|---|
| INTRAFLOOR MOVEMENT (PER 1m) | 1 |
| DOOR | 2 |
| STAIRCASE (UP) | 10 |
| STAIRCASE (DOWN) | 5 |
| OUTDOORS → INDOORS | 7 |
| INDOORS → OUTDOORS | 3 |
| ⋮ | ⋮ |

| DIRECTORY |
|---|
| CODE OF INPUT PROCESS |
| CODE OF DISPLAY PROCESS |
| CODE OF COMMUNICATION PROCESS |
| CODE OF POSITION ACQUIRING PROCESS |
| CODE OF FIRST STORAGE PROCESS |
| CODE OF SECOND STORAGE PROCESS |
| CODE OF DISTANCE ACQUIRING PROCESS |
| CODE OF DISTANCE DETERMINATION PROCESS |
| CODE OF REWRITING PROCESS |
| CODE OF NOTIFICATION PROCESS |

SYSTEM, APPARATUS AND METHOD FOR PROCESSING CALLS BASED ON PLACE DETECTION OF MOVING PERSONNEL OR OBJECTS

BACKGROUND OF THE INVENTION

1. Field of the Invention

The present invention relates to a communication system and a communication apparatus capable of performing a call or a notification operation using position information of the communication apparatus, a method for controlling the communication system and the communication apparatus, and a storage medium storing a program for controlling the communication apparatus.

2. Description of the Related Art

In general, when one goes to directly see a person whom he wants to contact, he may call the person in advance to ask the person to wait for him, he may meet the person by making an appointment, or he may go to see the person by estimating the location where the person is present. For that purpose, it is important to know where the person is.

Various means exist for contacting a person, such as a telephone, a pocket pager and the like. These means for contact are one-sided calling means no matter where the person is, or whether or not the person is busy.

A system for determining a person's location, such as a position sensor system using infrared rays (for example, the Active Badge System of the Olivetti Corporation), has resulted in various products. This system consists of badges (name tags) and sensors which emit and sense infrared rays, respectively. The sensors are disposed at various locations, such as a table, the wall or the ceiling of a room, the wall or the ceiling of a corridor, and the like, and the badge is attached to the chest of each person.

In this system, an ID (identifier) of the badge is periodically transmitted from the badge using infrared rays, and the sensor which has received the infrared rays transmits the received badge ID to the system. The position of the badge (the person having the badge) is detected based on the sensor which has reacted to the badge (the person having the badge). In addition, this system has the function of displaying the location of the badge (the person having the badge) on a picture surface based on the detected position information.

In order to call a person, a sound can be output from a speaker incorporated in the badge (this is the function of a so-called pocket pager).

However, if one goes to see or calls a person at a location in a state in which it is not clear whether or not the person is present at that location, it often happens that he cannot contact the person because the person is absent or busy. Such a failure in contact will cause a decrease in the efficiency of the operation. One may see a person when the person comes nearby. However, considering the fact that one also moves, the opportunity to see the person is, in some cases, very small. Furthermore, even if a person whom one wants to see is present nearby, he may not notice that person.

SUMMARY OF THE INVENTION

It is an object of the present invention to solve the above-described problems.

It is another object of the present invention to provide a contact supporting system which can reduce wasteful calls and perform a call by minimizing interruption to a communication partner's operation by determining if the communication partner can be called based on information relating to the location of the communication partner obtained from a position sensor system.

It is still another object of the present invention to provide a contact supporting system which can provide an individual with a chance to meet a person by considering the locations of the two persons, and which can minimize the distances of movement of the two persons.

It is yet another object of the present invention to provide a contact supporting system which can realize small distances of movement of the two persons, and perform a call by appropriately considering the state of the communication partner by simultaneously realizing the above-described two objects.

According to one aspect, the present invention which achieves these objectives relates to a communication system capable of acquiring the position information of a communication apparatus from a position detection means which detects a position of the communication apparatus. The system includes calling instruction means for performing a call instruction for calling the communication apparatus, determination means for determining whether or not a call in accordance with the calling instruction from the call instruction means is to be performed, based the position information of the communication apparatus acquired from the position detection means, and calling means for calling a first communication apparatus at a side to perform a call, or a second communication apparatus at a side to be called, in accordance with the determination of the determination means.

According to another aspect, the present invention which achieves these objectives relates to a communication apparatus capable of acquiring the position information of a communication apparatus from a position detection system for detecting a position of the communication apparatus. The apparatus includes instruction means for performing an instruction for causing the communication apparatus to perform a notification operation, determination means for determining whether or not the notification operation in response to the instruction from the instruction means is to be performed based the position information of the other communication apparatus acquired from the position detection system, and notification means for causing the communication apparatus to perform the notification operation in accordance with the determination by the determination means.

According to still another aspect, the present invention which achieves these objectives relates to a method for controlling a communication system capable of acquiring the position information of a communication apparatus from position detection means for detecting a position of the communication apparatus. The method includes a call instruction step of performing a call instruction for calling the communication apparatus, a determination step of determining whether or not a call in accordance with the call instruction in the call instruction step is to be performed based on the position information of the communication apparatus acquired from the position detection means, and a calling step of calling a first communication apparatus at a side to perform a call, or a second communication apparatus at a side to be called, in accordance with the determination of the determination step.

According to yet another aspect, the present invention which achieves these objectives relates to a method for controlling a communication apparatus capable of acquiring position information of a communication apparatus from a position detection system for detecting a position of the communication apparatus. The method includes an instruction step of performing an instruction for causing the communication apparatus to perform a notification operation, a determination step of determining whether or not the notification operation in response to the instruction in the instruction step is to be performed based on the position information of the communication apparatus acquired from the position detection system, and a notification step of performing the notification operation of the communication apparatus in accordance with the determination in the determination step.

According to yet a further aspect, the present invention which achieves these objectives relates to a storage medium which can be read by a computer and which stores a program for controlling a communication apparatus capable of acquiring the position information of a communication apparatus from a position detection system which detects a position of the communication apparatus. The program includes an instruction step of performing an instruction for causing the communication apparatus to perform a notification operation, a determination step of determining whether or not the notification operation in accordance with the instruction in the instruction step is to be performed based on the position information of the communication apparatus acquired from the position detection system, and a notification step of causing the communication apparatus to perform the notification operation in accordance with the determination in the determination step.

The foregoing and other objects, advantages and features of the present invention will become more apparent from the following description of the preferred embodiments taken in conjunction with the accompanying drawings.

BRIEF DESCRIPTION OF THE DRAWINGS

FIG. 6 is a diagram illustrating a format to store information relating to users in the first embodiment;

FIG. 7 is a diagram illustrating a format to store information relating to locations in the first embodiment;

FIG. 8 is a diagram illustrating a calculation formula used in the determination of a call in the first embodiment;

FIG. 9 is a diagram illustrating a rule used in the determination of a call in the first embodiment;

FIG. 20 is a diagram illustrating a position-information table controlled in the position-information database in the first embodiment;

FIG. 31 is a diagram illustrating a table for controlling sensor positions in the third embodiment;

FIG. 32 is a diagram illustrating a table for controlling distances to be added corresponding to respective locations in the third embodiment;

FIG. 33 is a diagram illustrating a table used for calculating a cost required for movement between locations in the third embodiment;

DESCRIPTION OF THE PREFERRED EMBODIMENTS

First Embodiment

Figure 1:
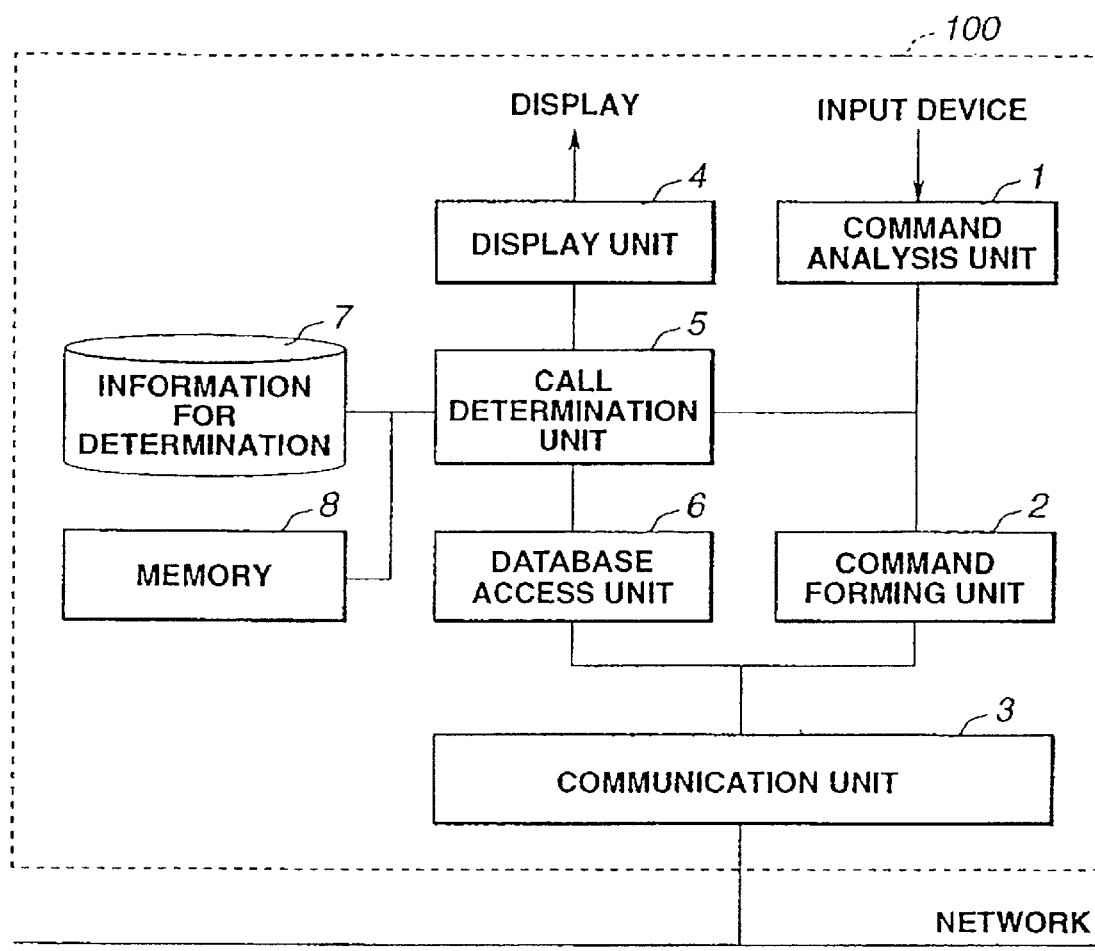
FIG. 1 is a block diagram illustrating the configuration of a system according to a first embodiment of the present invention.
Figure 2:
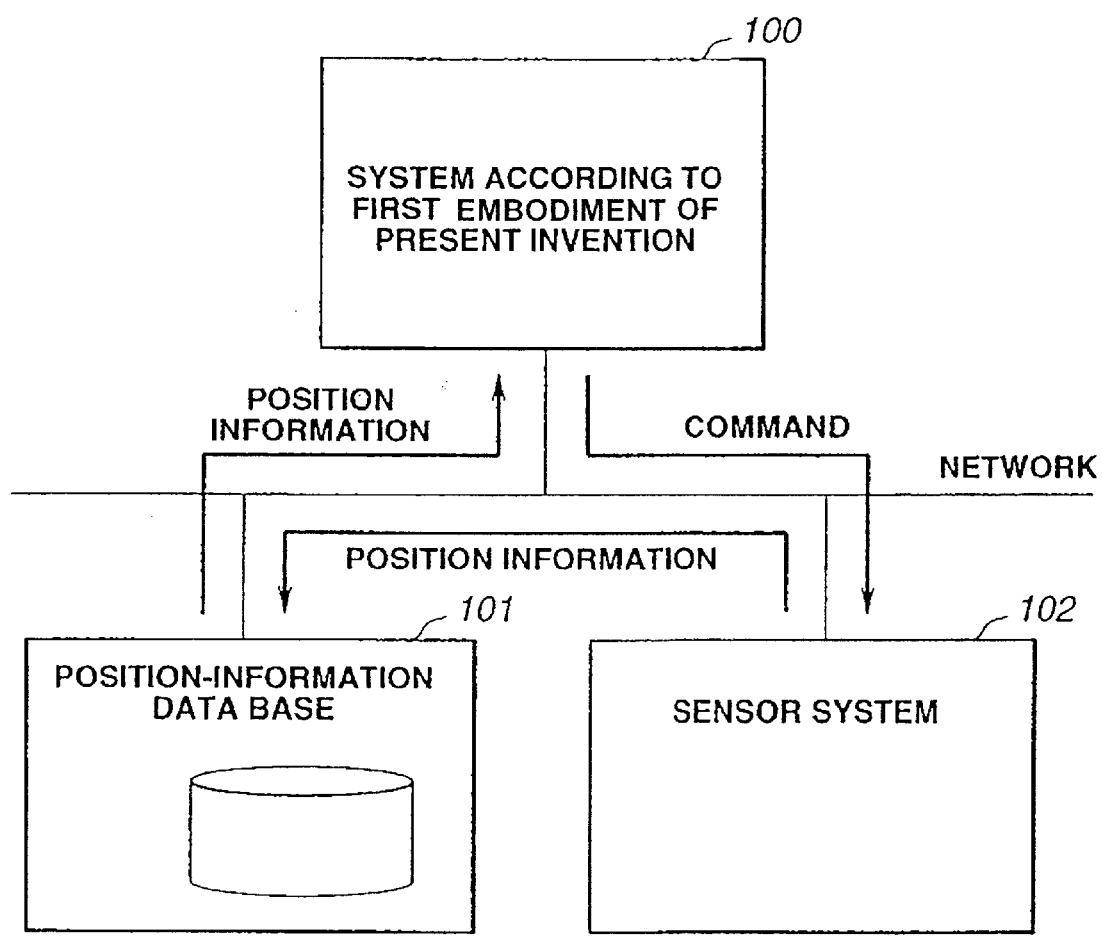
FIG. 2 is a diagram illustrating the relationship among the system of the first embodiment, a position-information database, and a sensor system.

FIG. 1 is a diagram illustrating the configuration of a contact supporting system according to a first embodiment of the present invention. FIG. 2 is a block diagram illustrating the relationship between the contact supporting system and a sensor system.

As shown in FIG. 1, a contact supporting system 100 of the first embodiment includes a command analysis unit 1, a command forming unit 2, a communication unit 3, a display unit 4, a call determination unit 5, a database access unit 6, an external storage device (information for determination) 7, and a memory 8.

Figure 3:
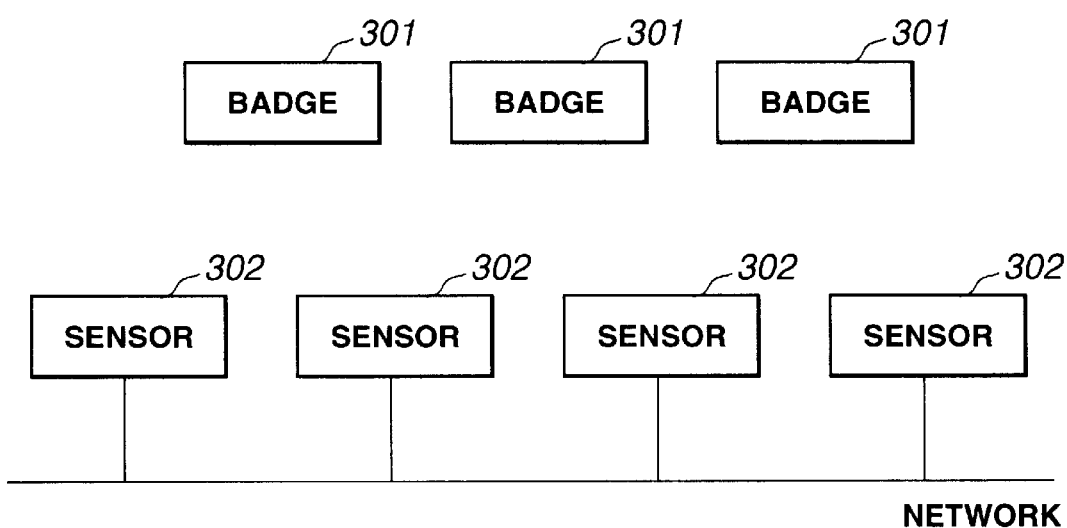
FIG. 3 is a block diagram illustrating the configuration of the sensor system in the first embodiment.

As shown in FIG. 2, the contact supporting system 100 of the first embodiment is connected to a sensor system 102 and a position-information database 101 via a network. As shown in FIG. 3, the sensor system 102 controls the positional relationship between a tag (badge) 301 held by an individual and sensors 302 disposed at various locations, by updating data in the position-information database 101. That is, each tag 301 periodically transmits an ID peculiar to the tag 301 using infrared rays or the like, and a sensor 302 receives a signal from the tag 301 when the tag 301 is present within the range of the sensor 302. The sensor 302 transmits the sensor's own ID and the received ID of the tag 301 to the position-information database 101. The position-information database 101 controls the position of the sensor 302 where the tag 301 is present, from the received information. The contact supporting system 100 obtains information relating to a person's location by referring to the data of the position-information database 101, and utilizes the obtained information for determining whether or not the person is to be called.

Each tag (badge) 301 in the sensor system 102 incorporates a speaker, so that a sound can be output from the speaker of a desired tag according to a command to call the person having the tag. The call using sound may be a telephone call utilizing a PBX (private branch exchange) or a call from a pocket pager.

In FIG. 1, the command analysis unit 1 is connected to an input device, such as a keyboard, a mouse or the like, and analyzes an input command. The command forming unit 2 forms a command to instruct the sensor system 102 to output a sound from the appropriate speaker.

The communication unit 3 is connected to the network, and performs communication with the position-information database 101 or the sensor system 102. The display unit 4 is connected to a display, and displays the contents of an output. The call determination unit 5 determines whether or not a person can be called, for example, based on the position information of the person.

The database access unit 6 refers to data from the position-information database 101. The external storage device (information for determination) 7 stores information relating to users utilizing the system and locations. The memory 8 is used by the system for temporarily storing data.

Figure 4:
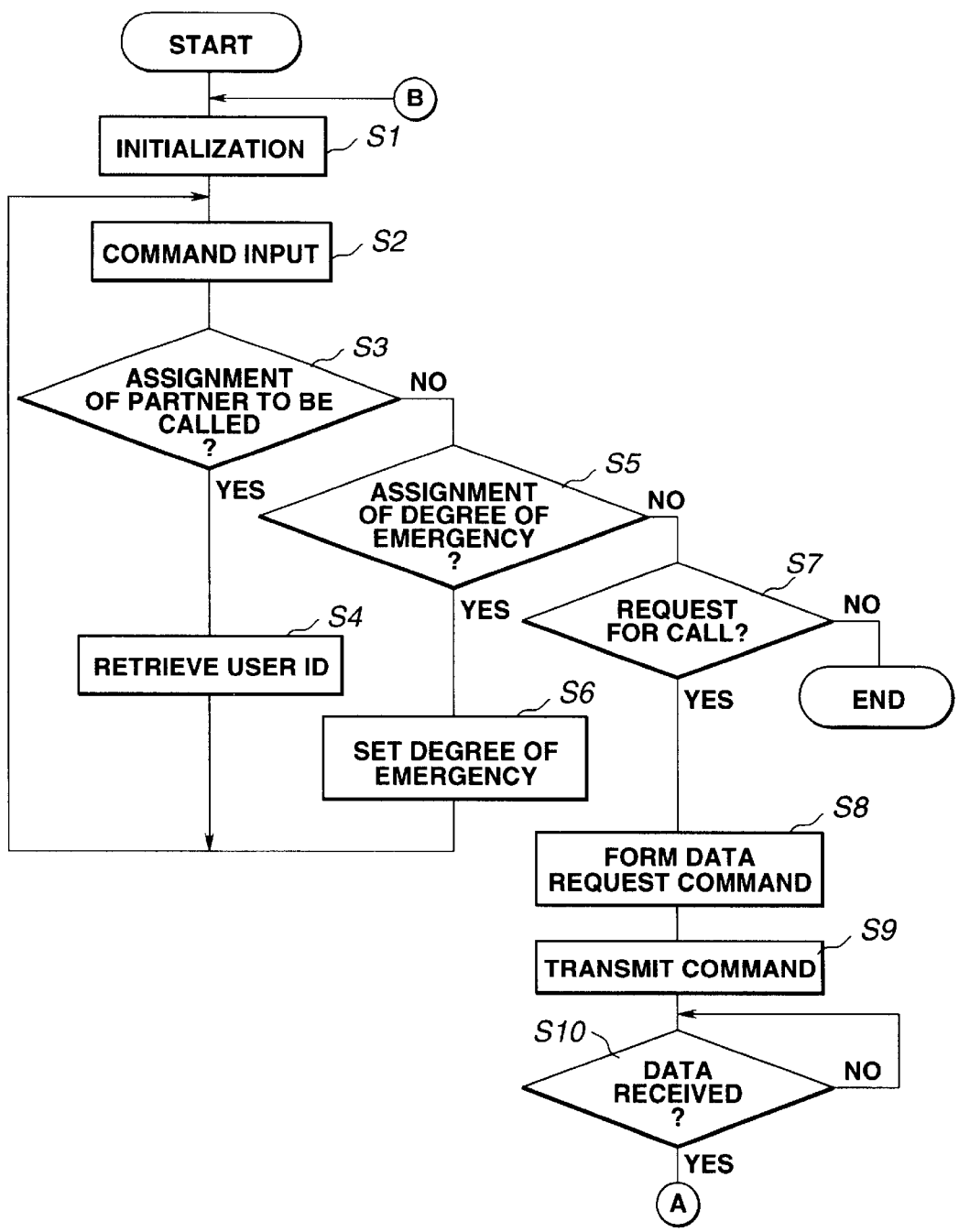
FIGS. 4 and 5 are flowcharts illustrating the operation of the system of the first embodiment.
Figure 5:
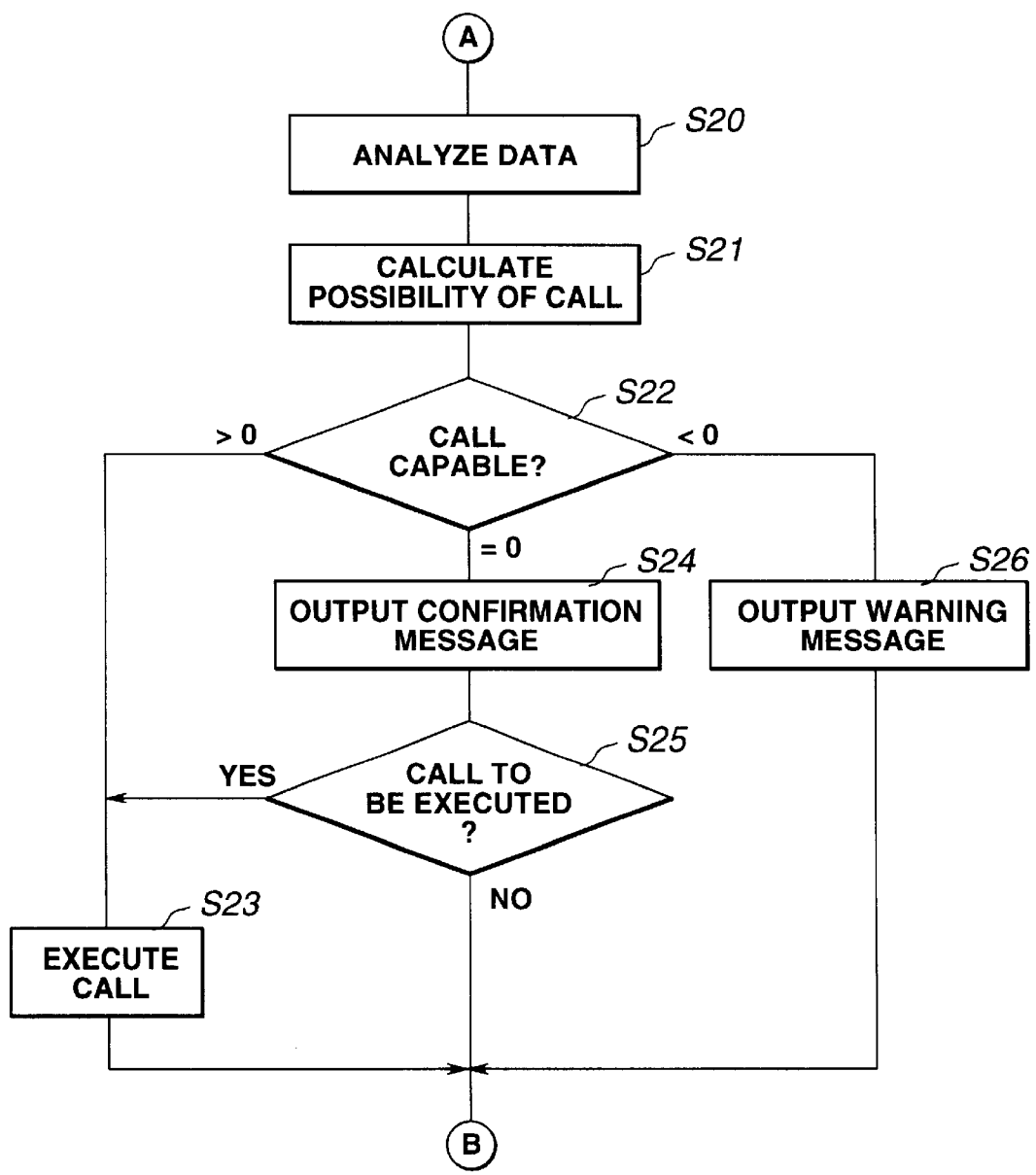

Next, a description will be provided of the operation of the system of the first embodiment with reference to the flowcharts shown in FIGS. 4 and 5.

The command analysis unit 1, the command forming unit 2, the call determination unit 5 and the like are provided as a part of the function of a microprocessor (not shown) provided in the system. The operation shown in the flowcharts is executed by a control program stored in a memory within the microprocessor. Such a control program of the microprocessor may be stored in advance in a storage medium such as a hard disk, a floppy disk, a CD-ROM (compact disk read-only memory) or the like, then may be set in a reader (not shown) of the system of the first embodiment, and may be read into the microprocessor.

FIG. 4 is a flowchart illustrating the flow of processing when a command is input from an input device, from the start to the end of the system of the first embodiment.

When the system of the first embodiment has been started, first, in step S1, initialization of variables used within the system is performed. When a command has been input from the input device in step S2, the command analysis unit 1 analyzes the input command.

Then, in step S3, it is determined if the input command is assignment of a partner to be called. If the result of the determination in step S3 is affirmative, the process proceeds to step S4, where the user ID of the partner to be called is retrieved. When assigning the partner to be called, the user assigns the partner using the partner's name, and the user ID is retrieved using the name.

Information necessary for the retrieval is stored in the external storage device 7 in a format as shown in FIG. 6. The information is configured by a list including three items, i.e., a user name, a user ID, and a level. The level indicates the user's authority when the user calls another person. The authority to call the other person is larger as the value of the level is larger. In the first embodiment, the level is represented by an integer between 0 and 10. The user ID obtained by the retrieval is stored in the memory 8.

The value of the level may be determined based on various factors, such as ranking in a company, the relationship between a salesman and a customer, and the like.

If the result of the determination in step S3 is negative, the process proceeds to step S5, where it is determined if the input command assigns a degree of emergency (urgency, pressure). If the result of the determination in step S5 is affirmative, the process proceeds to step S6, where the assigned degree of emergency is stored in the memory 8. In the first embodiment, the degree of emergency is represented by an integer between 0 and 10. The initial value when the degree of emergency is not assigned is set to 0. For example, by increasing the value of the degree of emergency value, a call from a subordinate to a superior may be made.

Upon completion of the processing of step S4 or S6, the process returns to step S2.

If the result of the determination in step S5 is negative, the process proceeds to step S7, where it is determined if the input command is a request for execution of a call. If the result of the determination in step S7 is affirmative, the process proceeds to step S8, where the command forming unit 2 forms a position-information-data request command which is to be transmitted from the database access unit 6 to the position-information database 101. Then, in step S9, the database access unit 6 transmits the command formed in step S8 to the position-information database 101 via the communication unit 3.

Then, in step S10, the communication unit 3 awaits reception of position-information data from the position-information database 101. Processing when the communication unit 3 receives position-information data from the position-information database 101 will be described below with reference to FIG. 5.

If the result of the determination in step S7 is negative, the input command is an end command. Hence, the system of the first embodiment is terminated.

FIG. 5 is a flowchart illustrating processing when the system of the first embodiment receives position-information data from the position-information database 101.

In FIG. 5, when the communication unit 3 has received position-information data, in step S20 the database access unit 6 analyzes the received data. Position-information data obtained as the result of the analysis is stored in the memory 8. Position information obtained from the position-information database 101 is the sensor ID of the sensor 302 where the tag 301 of the partner to be called is located.

Then, in step S21, the call determination unit 5 calculates a numeral representing the determination of a call indicating the degree of callability. FIG. 8 illustrates a formula used in this calculation. In FIG. 8, a user m is a calling side, and a user n is a called side. The level of each user is referred to based on the table stored in the external storage device 7 shown in FIG. 6.

Since the user ID of the person to be called is stored in the memory 8 in step S4 shown in FIG. 4, the table is referred to using the user ID. The user ID of the calling side (the user m) is set in advance (the user ID of the user logged in the system), and the table is referred to using that user ID. The value stored in the memory 8 in step S6 shown in FIG. 4 is used as the degree of emergency. The level of the location where the user n is present is a number indicating the difficulty of calling a user when he is in that location, and is represented in the first embodiment by an integer between 0 and 10. The greater the value, the more difficult it is to call a user present in that location.

When the numeral representing the determination of a call has been calculated according to the formula shown in FIG. 8, the process proceeds to step S22, where it is determined if the user assigned in FIG. 4 can be called. The rule used in this determination is shown in FIG. 9. When the numeral representing the determination is larger than 0, it is determined that a call can be executed. When the numeral representing the determination is 0, it is determined that a call can be executed or cannot be executed. When the numeral representing the determination is less than 0, it is determined that a call cannot be executed.

When the numeral representing the determination is larger than 0 in step S22, the process proceeds to step S23, where a call is executed. In the first embodiment, a command to output a sound from the speaker of the concerned tag (badge) is generated for the sensor system 102, and the generated command is transmitted to the sensor system 102. This calling process may be performed by dialing a telephone using a PBX, or ringing a pocket pager.

Figure 10:
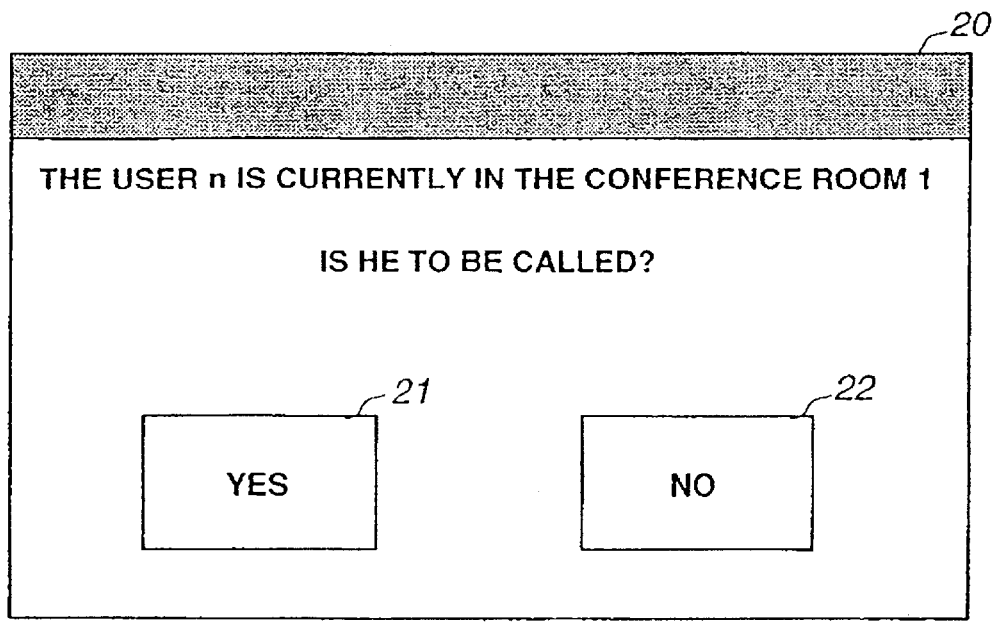
FIG. 10 is a diagram illustrating a display of a confirming dialog in the first embodiment.

When the numeral representing the determination in step S22 is 0, the process proceeds to step S24 where the display unit 4 displays a confirmation dialog 20 shown in FIG. 10 on its display. That is, if it cannot be determined whether or not a call is to be executed, the determination is left for the user. It is determined whether or not a call is to be executed by depressing a "yes" button 21 or a "no" button 22 by the user. When one of the buttons has been depressed, the confirmation dialog 20 is erased.

In step S25, the call determination unit 5 checks the depressed button. When the "yes" button 21 has been depressed, the process proceeds to step S23 where a call is executed. When the "no" button 22 has been depressed, the process returns to step S1.

Figure 11:
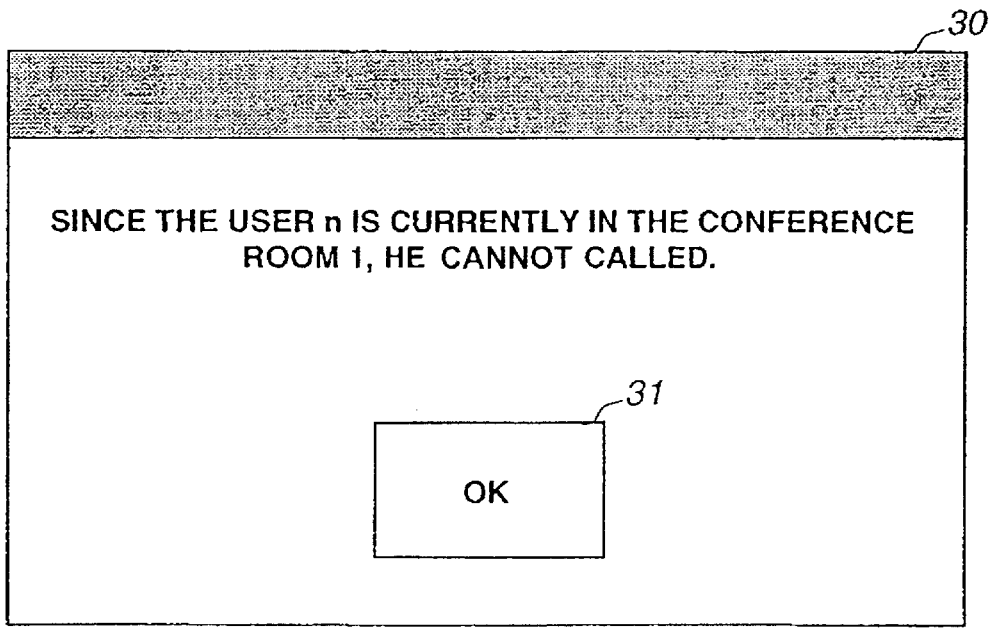
FIG. 11 is a diagram illustrating a display of an alarming dialog in the first embodiment.

When the numeral representing the determination is less than 0, the process proceeds to step S26 where it is determined that a call cannot be executed, and the display unit 4 outputs a warning dialog shown in FIG. 11 on its display. When the user has depressed an "OK" button 31, the warning dialog 30 is erased, and the process is terminated. Completion of the processing of steps S23, S24, S25 and S26 indicates completion of one cycle of the operation of the system of the first embodiment, and the process returns to step S1 shown in FIG. 4.

The contents of the call determination processing in steps S21 and S22 will now be described using specific numerical values shown in FIGS. 6 and 7.

First, calculation will be performed for a case in which a user A calls a user B present in conference room 1. The degree of emergency is assumed to be 1. Since the level of user A is 10, the level of user B is 0, and the level of the conference room 1 is 7, the numeral representing the determination is 10−0+1−7=4, which is larger than 0. Hence, a call is executed in this case.

Next, calculation will be performed for a case in which a user C calls user A present in executive room 1. The degree of emergency is assumed to be 5. Since the level of the user C is 5, the level of the user A is 10, and the level of the executive room 1 is 10, the numeral representing the determination is 5−10+5−10=−10, which is less than 0. Hence, a call cannot be executed in this case.

Next, the configurations and the operations of the position-information database 101 and the sensor system 102 utilized in the system of the first embodiment will be described in detail with reference to the drawings.

Figure 12:
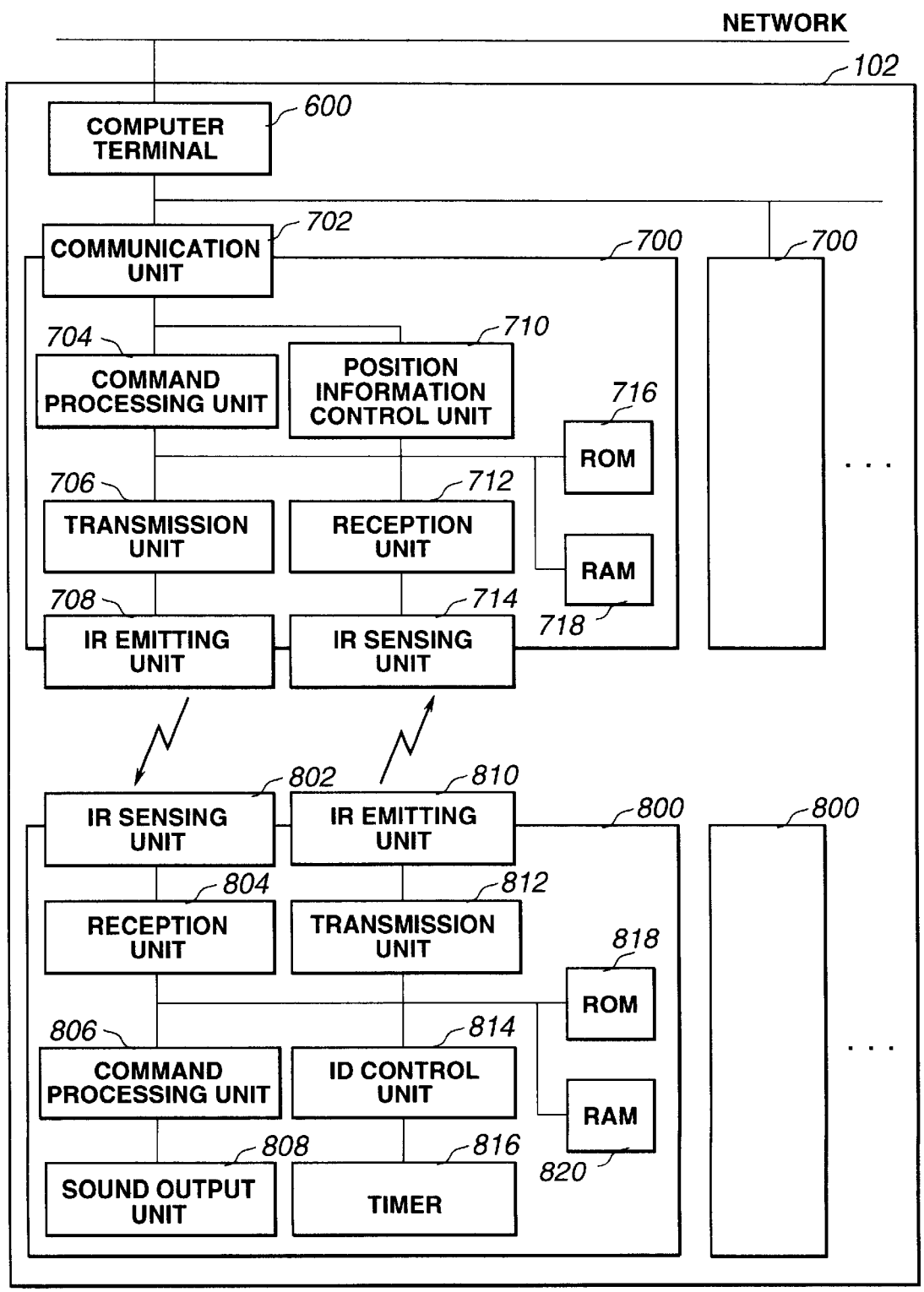
FIG. 12 is a block diagram illustrating the configuration of a position sensor system in the first embodiment.

FIG. 12 is a block diagram illustrating the configuration of the sensor system 102. In FIG. 12, a computer terminal 600 collects position information and transmits the collected information to the network. Sensors 700 are connected to the computer terminal 600 via cables, such as serial or the like. A plurality of sensors 700 are disposed at locations to be detected before operating the system, and all of the sensors 700 are connected to the computer terminal 600. A badge 800 is mounted on the chest or the like of each user. A description will now be provided of the system of the first embodiment in which infrared rays are used for communication between the badges 800 and the sensors 700.

In the sensor 700, a communication unit 702 performs communication with the computer terminal 600. A command processing unit 704 receives and analyzes a command transmitted from the computer terminal 600. A transmission unit 706 transmits the command received by the command processing unit 704 to the badges 800. An IR (infrared ray) emitting unit 708 converts an electrical signal into infrared rays and emits the infrared rays toward the badges 800. A position-information control unit 710 forms position information obtained by combining a badge ID and a sensor ID received from each badge 800, and the obtained position information is transmitted from the communication unit 702. A reception unit 712 receives the badge ID from the badge 800. An IR sensing unit 714 senses the infrared rays transmitted from the badge 800, converts the contents of the received infrared rays into an electrical signal, and transmits the electrical signal to the reception unit 712. Programs for processing the operations of the sensors 700, sensor ID's peculiar to the respective sensors, and the like are written in a ROM 716. A RAM (random access memory) 718 is used as region for temporarily storing data during the operation of the sensors 700.

In the badge 800, an IR sensing unit 802 senses the infrared rays emitted from the sensor 700, converts the contents of the sensed infrared rays into an electrical signal, and transmits the electrical signal to a reception unit 804. The reception unit 804 receives a command transmitted from the sensor 700. A command processing unit 806 analyzes and executes a command received by the reception unit 804. A sound output unit 808 generates a sound in accordance with the command of the command processing unit 806. An IR emitting unit 810 converts an electrical signal into infrared rays, and transmits the infrared rays toward the sensors 700. A transmission unit 812 transmits a badge ID to the IR emitting unit 810 to cause it to transmit the infrared rays toward the sensors 700. An ID control unit 814 periodically transmits a command to transmit the badge ID in accordance with the operation of a timer 816. Programs for processing the operation of the badge 800, the badge ID peculiar to the badge, and the like are written in a ROM 818. A RAM 820 is used as a region for temporarily storing data during the operation of the badge 800. The timer 816 is used for acquiring a time interval of transmission of the badge ID.

Figure 13:
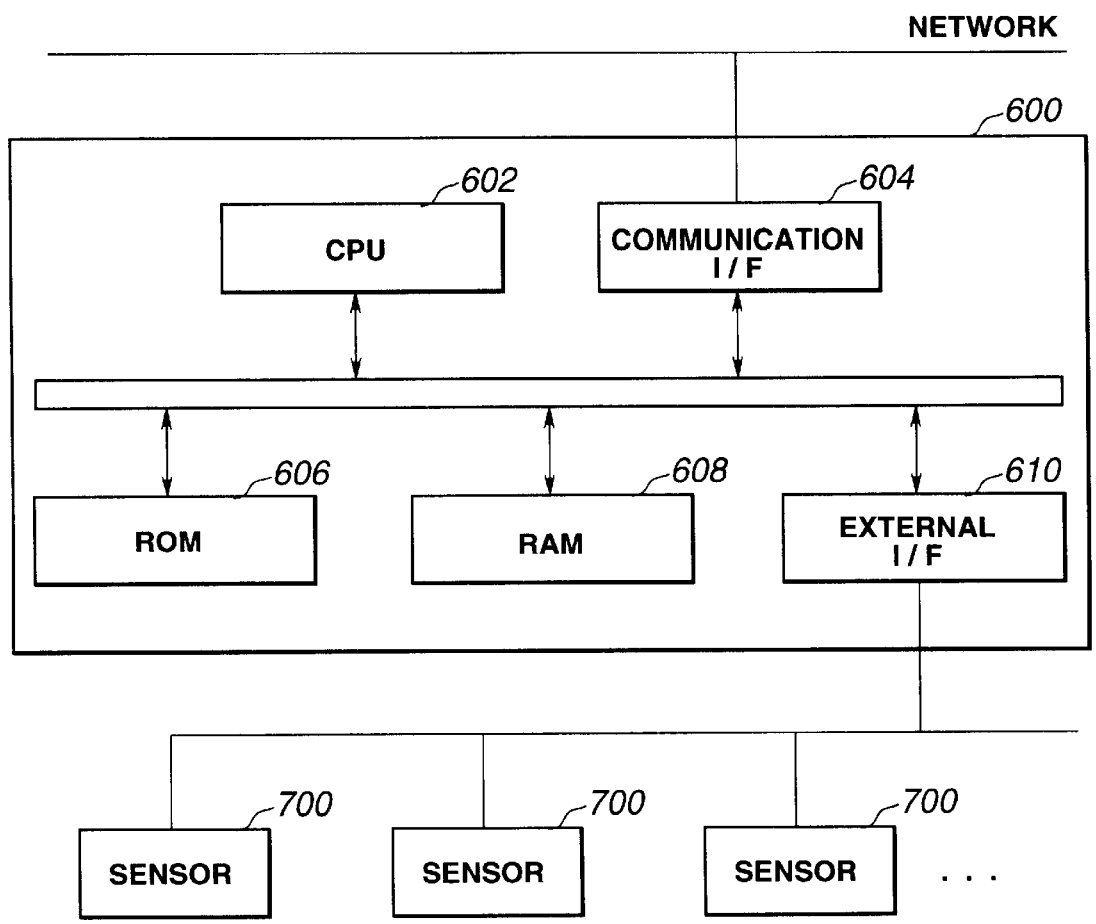
FIG. 13 is a block diagram illustrating the hardware of a computer terminal which executes a part of the position sensor system of the first embodiment.

The computer terminal 600 is configured as shown in FIG. 13. In FIG. 13, a CPU (central processing unit) 602 controls a RAM 608, a communication I/F (interface) 604, and an external I/F 610 in accordance with programs stored in a ROM 606. The ROM 606 stores various kinds of programs for processing position information received from the external I/F 610, and for executing processing of the CPU 602. Programs for operating the sensor system 102 executed under the control of the CPU 602 are stored in the ROM 606. The communication I/F 604 is connected to the network and transmits position information acquired by the system to the network in response to a request. The external I/F 610 is connected to the plurality of sensors 700 in order to receive position information from each of the sensors 700.

Next, the operations in the respective units of the sensor system 102 will be described.

Figure 14:
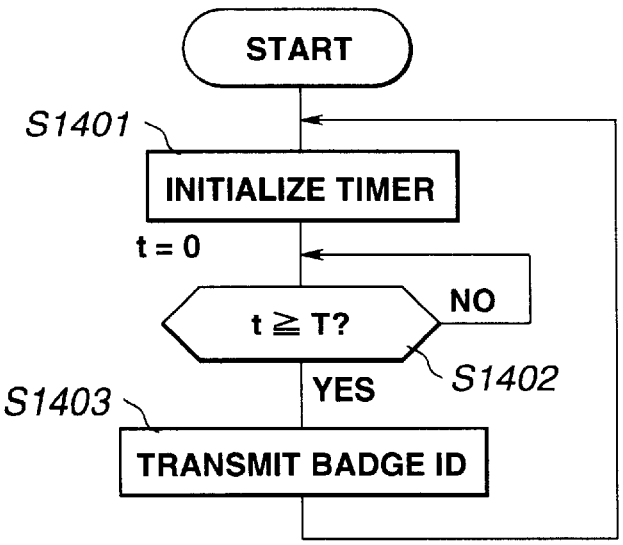
FIGS. 14 and 15 are flowcharts illustrating the operation of a badge of the position sensor system in the first embodiment.

FIG. 14 is a flowchart illustrating the process of periodically transmitting the badge ID of each badge 800. In FIG. 14, first, in step S401, the ID control unit 814 initializes the timer 816. In the initialization of the timer 816, a time variable t is set to 0. Thereafter, the timer 816 periodically increments the value t (for example, increments by one at every second). In step S1402, the timer 816 determines if the value t reaches a set value T every time the value t is incremented. The set value T is stored in the ROM 818. The set value T is read into the RAM 820 and is compared with the value t. When the value t has not reached the value T, the comparison is again performed by repeating the process of step S1402. When the value t has reached the value T, then, in step S1403, the ID control unit 814 transmits a command to transmit the badge ID to the transmission unit 812. The transmission unit 812 which has received the command converts the badge ID into infrared rays and transmits the infrared rays via the IR emitting unit 810. The badge ID is stored in the ROM 818, and is referred to by being read into the RAM 820.

Figure 15:
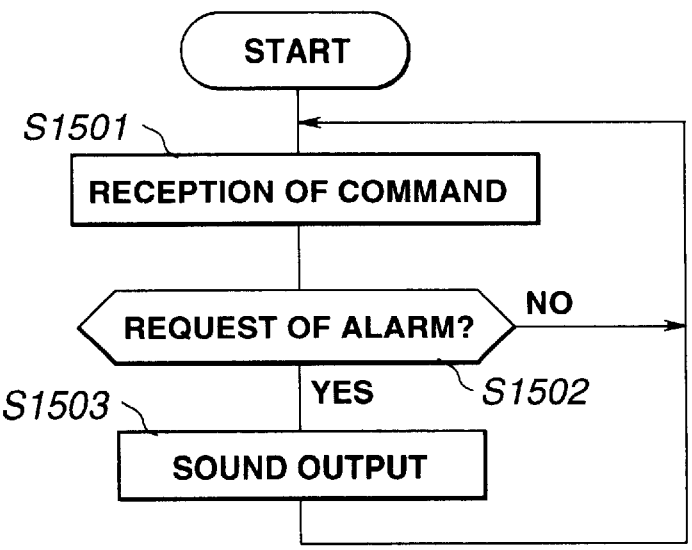

FIG. 15 is a flowchart illustrating processing when a command from the sensor 700 has been received, and where the badge 800 is present. In FIG. 15, first, in step S1501, when the IR sensing unit 802 has sensed infrared rays, the reception unit 804 receives a command. Then, in step S1502, the command processing unit 806 determines if the received command is an alarm request. If the result of the determination in step S1502 is affirmative, the process proceeds to step S1503, where the command processing unit 806 transmits a sound output command to the sound output unit 808, which outputs a sound. Upon completion of this processing, the process returns to step S1501 in order to await the next command. If the result of the determination in step S1502 is negative, the command is ineffective and the process returns to step S1501.

Figure 16:
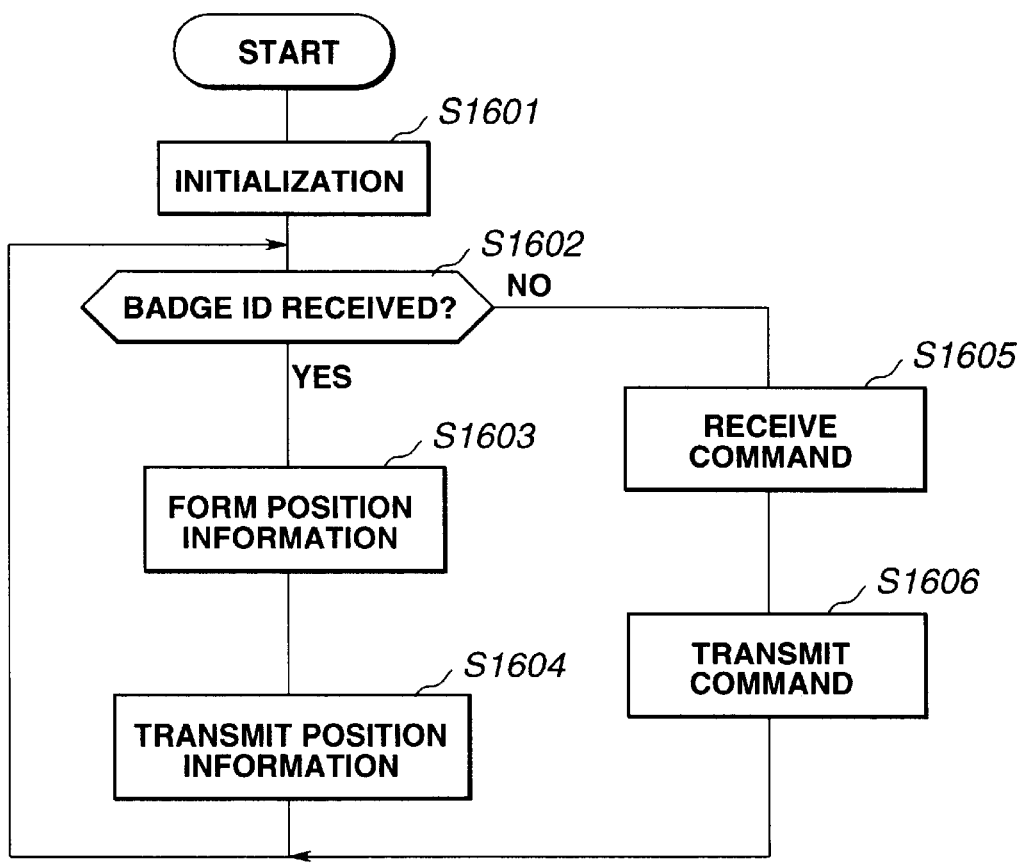
FIG. 16 is a flowchart illustrating the operation of a sensor of the position sensor system in the first embodiment.
Figure 17:
FIG. 17 is a diagram illustrating a format of the position information exchanged between the position sensor system and the position-information database in the first embodiment.

FIG. 16 is a flowchart illustrating the operation of the sensor 700. In FIG. 16, first, in step S1601, the sensor 700 is initialized. In the initialization of the sensor 700, for example, the RAM 718 is cleared. Then, in step S1602, it is determined if the badge ID from the badge 800 has been received. The badge ID is received in the following manner. The infrared rays emitted from the badge ID are sensed by the IR sensing unit 714, which converts the contents of the received infrared rays into an electrical signal and transmits the electrical signal to the reception unit 712. The reception unit 712 which has received the badge ID completes the reception by storing the received badge ID into the RAM 718. Then, in step S1603, the position-information control unit 710 forms position information. In the first embodiment, the position information in the sensor 700 is a pair of data comprising the sensor ID stored in the ROM 716, and the received badge ID. FIG. 17 illustrates the format of the position information. A header as shown in FIG. 17 contains information for communicating with the computer terminal 600, and includes the length of data, the ID number of the data, and the like. In step S1604, the position-information control unit 710 transmits a data transmission command to the communication unit 702, and the formed position information is transmitted to the computer terminal 600. Upon completion of the transmission, the processing starting from the step S1601 is repeated.

If the result of the determination in step S1602 is negative, the received data is a command from the computer terminal 600, and the process proceeds to step S1605, where the command analysis unit 704 receives and analyzes the received command. Then, in step S1606, the received command is transmitted to the concerned badge 800. More specifically, the command processing unit 704 transmits a command transmission instruction to the transmission unit 706. The transmission unit 706 transmits the command to the IR emitting unit 810, which converts the received command into infrared rays and emits the infrared rays.

Figure 18:
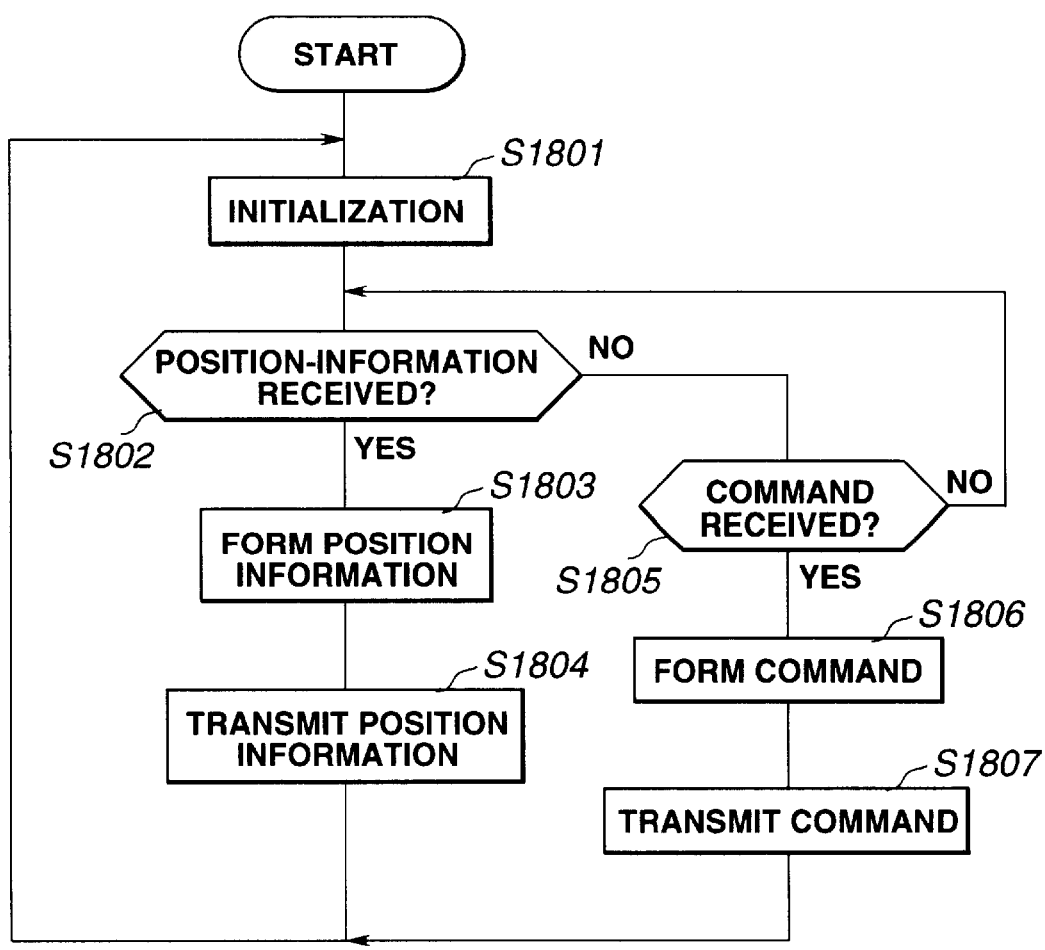
FIG. 18 is a flowchart illustrating the flow of a program operating in a computer terminal of the position sensor system of the first embodiment.

FIG. 18 is a flowchart illustrating the operation of the computer terminal 600. In FIG. 18, first, in step S1801, various kinds of initializing operations are performed. The initializing operations include reading a program for the operation of the computer terminal 600 from the ROM 606 into the RAM 608, setting the value of the region for variables in the RAM 608 to an initial value, and the like. Then, in step S1802, it is determined if position information from the sensor 700 has been received by the external I/F 610. If the result of the determination in step S1802 is affirmative, the process proceeds to step S1803, where position information to be transmitted to the position-information database 101 is formed. Then, in step S1804, the position information is transmitted to the network via the communication I/F 604. Upon completion of the transmission of the position information, the processing starting from the step S1801 is repeated.

If the result of the determination in step S1802 is negative, the process proceeds to step S1805, where it is determined if a command from the system 100 of the first embodiment has been received. More specifically, it is determined if the communication I/F 604 has received command data from the network. If the result of the determination in step S1805 is negative, the processing starting from step S1802 is repeated. If the result of the determination in step S1805 is affirmative, the process proceeds to step S1806, where a command to be transmitted to the sensor 700 is formed. Then, in step S1807, the formed command is transmitted from the external I/F unit 610. Upon completion of the transmission of the command, the processing starting from step S1802 is repeated. Next, the operation of the position-information database 101 will be described.

Figure 19:
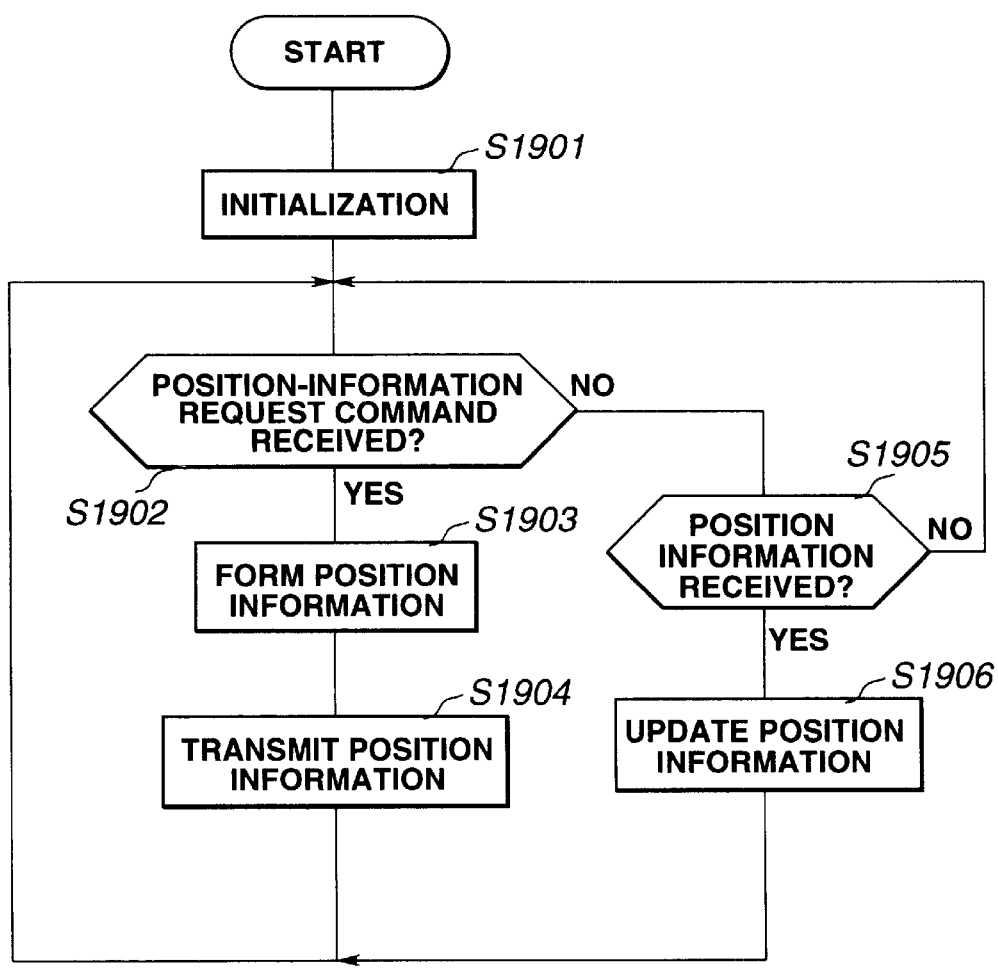
FIG. 19 is a flowchart illustrating the operation of the position-information database in the first embodiment.

FIG. 19 is a flowchart illustrating the operation of the position-information database 101. In FIG. 19, first, in step S1901, various kinds of initializing operations are performed. The initializing operations include reading a program for the operation of the position-information database 101 from a ROM 906 into a RAM 908, setting the value of the region for variables in the RAM 908 to an initial value, and the like. Then, in step S1902, it is determined if a position-information request command has been received from the system 100 of the first embodiment. If the result of the determination in step S1902 is affirmative, the process proceeds to step S1903, where position information relating to the user assigned by the command is formed. Then, in step S1904, the position information is transmitted. Upon completion of the transmission of the position information, the process returns to step S1902.

If the result of the determination in step S1902 is negative, the process proceeds to step S1905, where it is determined if position information from the position sensor system 102 has been received. If the result of the determination in step S1905 is affirmative, the process proceeds to step S1906, where the position information is updated. In the first embodiment, the position information is controlled by a table as shown in FIG. 20. The sensor ID indicating the position of the concerned person, and the time of reception of the position information are updated for the badge ID in the received position information. The time is acquired from a clock signal incorporated within the system. This table is stored in an external storage device (for example, a hard disk). When updating position information, the writing of data is performed via an external I/F 910.

When the badge ID in the received position information appears for the first time, that badge ID is added to the table.

Second Embodiment

Next, a second embodiment of the present invention will be described.

Figure 21:
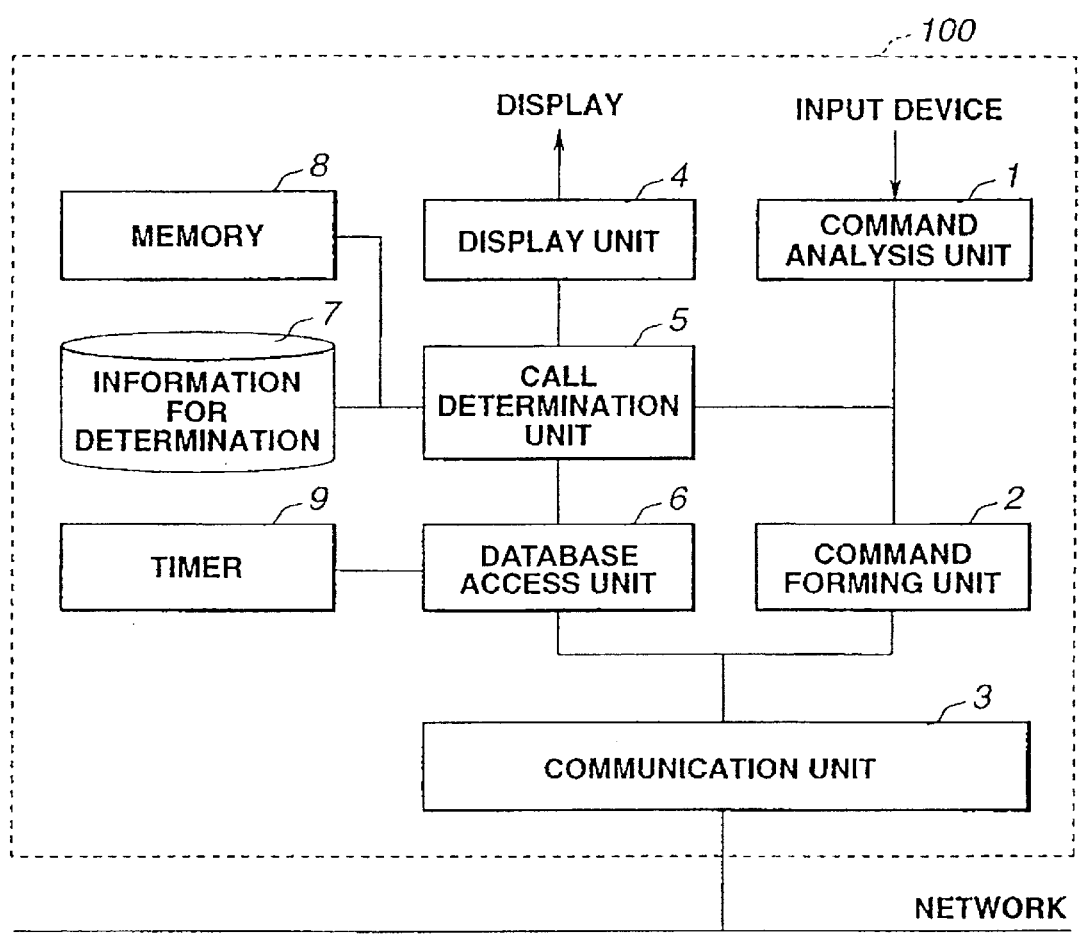
FIG. 21 is a block diagram illustrating the configuration of a system according to a second embodiment of the present invention.

FIG. 21 is s block diagram illustrating the configuration of a contact supporting system according to the second embodiment. The configuration shown in FIG. 21 differs from the configuration shown in FIG. 1 only in that a timer 9 is connected to the database access unit 6.

Figure 22:
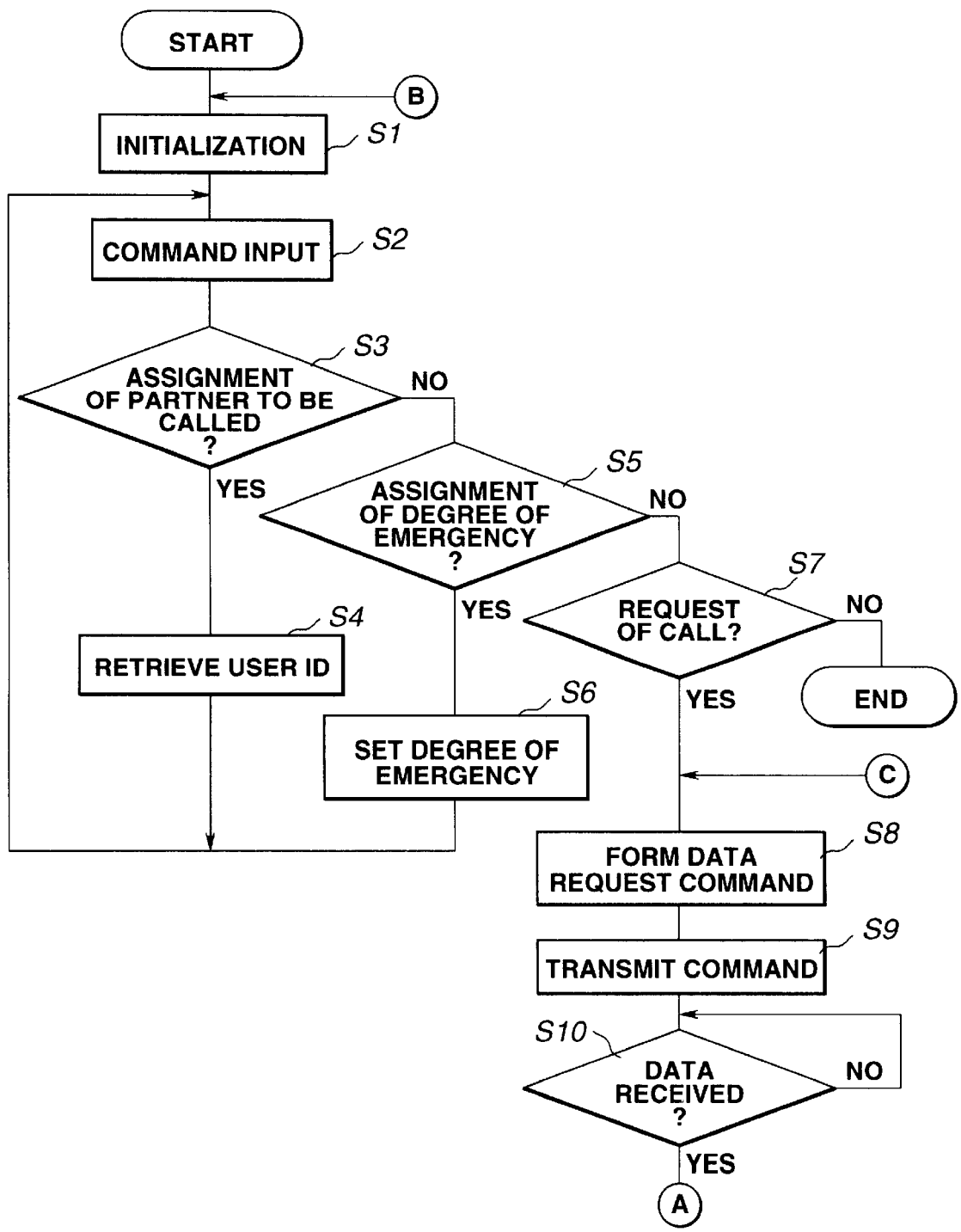
FIGS. 22 and 23 are flowcharts illustrating the operation of the system of the second embodiment.
Figure 23:
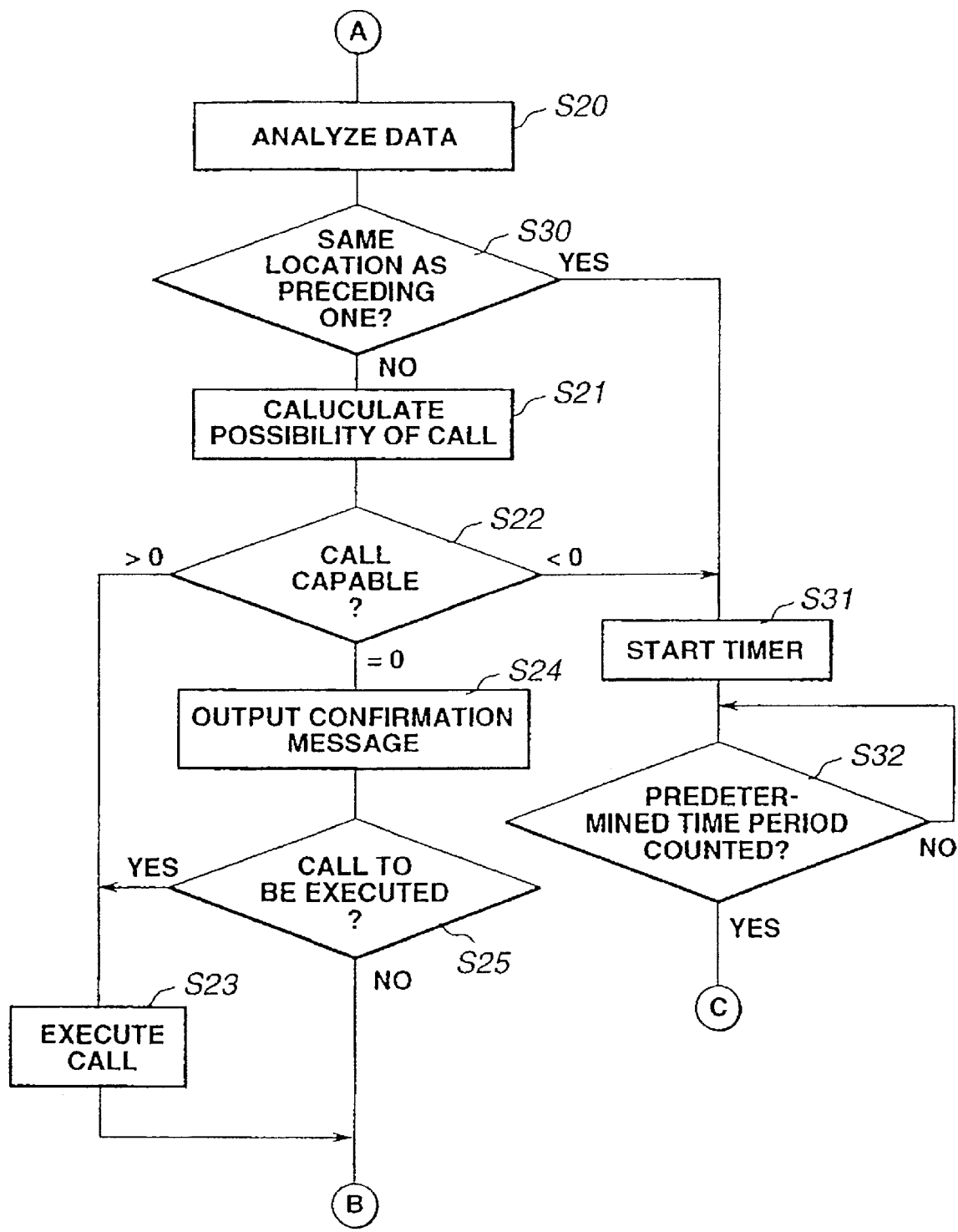

FIGS. 22 and 23 are flowcharts illustrating the operation of the contact supporting system of the second embodiment.

In the second embodiment, a retrying function is provided in which, when it has been determined that a call cannot be performed as a result of determination of a call, a change in the location of the concerned person is automatically awaited and calling processing is repeated. The timer 9 causes the database access unit 6 to operate periodically as set when starting the system, so as to repeatedly execute the processing from step S8 to step S10 shown in FIG. 4. For that purpose, in FIG. 22, a confluent terminal C for repeated execution is added.

FIG. 23 is a flowchart illustrating the process of determining a call. In FIG. 23, step S30 determines if the current location of the user is the same as the preceding location, and is added between the data analysis (step S20) and the calculation of the possibility of a call (step S21) shown in FIG. 5.

When it has been determined that a call cannot be performed, the timer 9 is started in step S31 instead of outputting a warning dialog. When a predetermined time period has been reached in step S32, the process proceeds from a branching terminal C to step S8 shown in FIG. 22. Thus, when a call has failed, call determination processing is repeated. The timing of the repeat is set by the timer 9. Thus, call determination is repeated until a call succeeds.

Third Embodiment

Next, a description will be provided of still another example of the system of the present invention.

Figure 24:
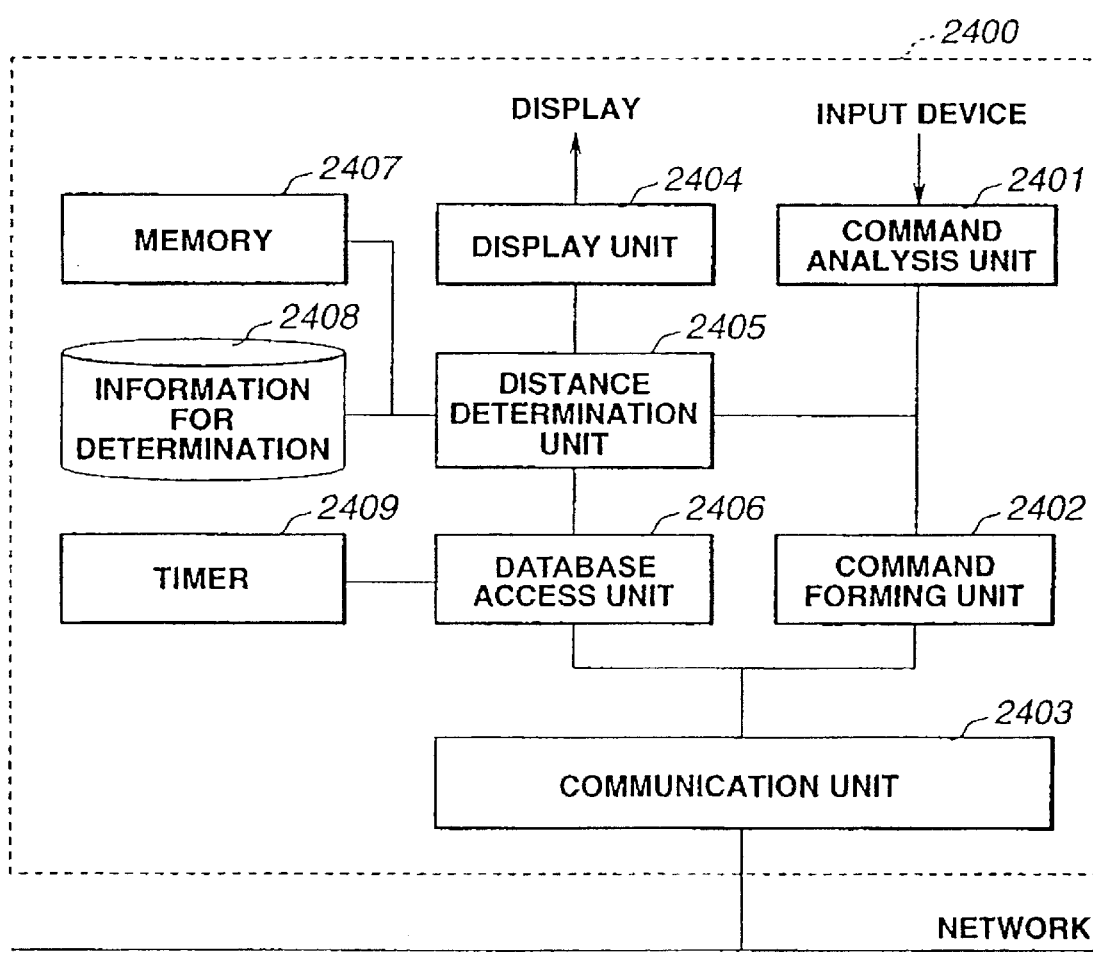
FIG. 24 is a block diagram illustrating the configuration of a system according to a third embodiment of the present invention.

FIG. 24 is a block diagram illustrating the configuration of the contact supporting system according to a third embodiment of the present invention.

As shown in FIG. 24, a system 2400 of the third embodiment includes a command analysis unit 2401, a command forming unit 2402, a communication unit 2403, a display unit 2404, a distance determination unit 2405, a database access unit 2406, a memory 2407, an external storage device (information for determination) 2408, and a timer 2409.

As in the first embodiment, it is assumed that the contact supporting system 2400 is connected to the sensor system 102 and the position-information database 101 via the network shown in FIG. 2.

The sensor system 102 controls the positional relationship between a tag (badge) held by a person and sensors disposed at various locations by updating data of the position information database 101. The sensing may be performed using infrared rays, radio waves, ultrasonic waves, magnetism, or a combination of these media.

The contact supporting system 2400 obtains information relating to a person's location by referring to data of the position-information database 101, and utilizes the obtained information for determining whether or not the person is to be called. Each tag (badge) in the sensor system 102 incorporates a speaker, so that a sound can be output from the speaker of a desired tag according to a command. The sound is used to notify that the person having the tag is approaching. It can be easily imagined that the alarm by the sound may be realized by using a telephone utilizing a PBX, or a pocket pager.

In FIG. 24, the command analysis unit 2401 is connected to an input device, such as a keyboard, a mouse or the like, and analyzes an input command. The command forming unit 2402 forms a command to instruct the output of a sound from the concerned speaker. The communication unit 2403 is connected to the network, and performs communication with the position-information database 101 or the sensor system 102.

The display unit 2404 is connected to a display, and displays the contents of an output. The distance determination unit 2405 calculates the distance between the user and a person to be called based on the position-information data of the user and the person, and determines whether or not the distance is within an assigned range.

The database access unit 2406 refers to data from the position-information database 101. The external storage device (information for determination) 2408 stores information relating to users utilizing the system of the third embodiment and locations. The memory 2407 is used by the system for temporarily storing data. The timer 2409 controls time so that the database access unit 2406 periodically refers to position information.

Next, the operation of the system will be described with reference to a flowchart.

Figure 25:
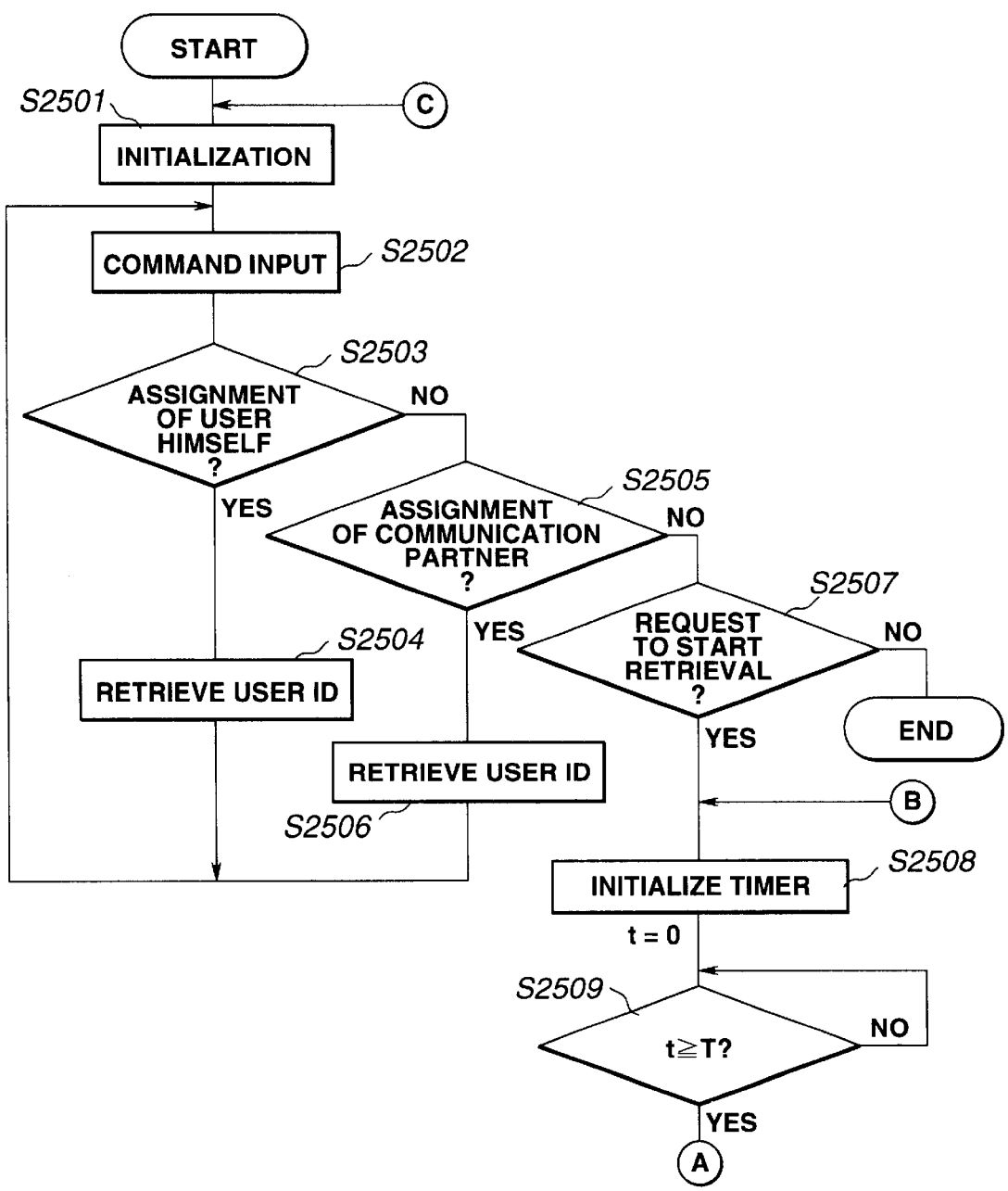
FIGS. 25 and 26 are flowcharts illustrating the operation of the system of the third embodiment.

FIG. 25 is a flowchart illustrating the flow of processing when a command is input from the input device, from the start to the end of the system of the third embodiment.

When the system has been started, first, in step S2501, initialization of variables used within the system is performed. When a command has been input from the input device in step S2502, the command analysis unit 2501 analyzes the input command. Then, in step S2503, it is determined if the input command is assignment of the user himself.

The system of the third embodiment can be used by anybody, and assumes a case in which even the user's name is assigned. When the system is used only by a user who has started the system, the user's name can also be acquired using an environment variable or the like.

If the result of the determination in step S2503 is affirmative, the process proceeds to step S2504, where the user ID is retrieved. Since the user assigns himself by the user's own name, the user ID is retrieved by that name. Information necessary for this retrieval is stored in the external storage device 2408 in the form of a list including each combination of a user name and a user ID. The user ID obtained by the retrieval is stored in the memory 2407.

If the result of the determination in step S2503 is negative, the process proceeds to step S2505, where it is determined if the input command assigns a communication partner. If the result of the determination in step S2505 is affirmative, the process proceeds to step S2506, where the user ID is retrieved in the same manner as in step S2504, and the result of the retrieval is stored in the memory 2407.

Upon completion of the above-described step S2504 or step S2506, the process returns to step S2502.

If the result of the determination in step S2505 is negative, the process proceeds to step S2507, where it is determined if the input command is a request to retrieve the distance between the user and the communication partner. If the result of the determination in step S2507 is affirmative, the process proceeds to step S2508, where the timer 2409 is initialized. In the initialization of the timer 2409, a time variable t is set to 0. The value t of the timer 2409 is periodically incremented. Every time the value t is incremented, the timer 2409 determines in step S2509 if the value t has reached a set value T. If the result of the determination in step S2509 is affirmative, the process proceeds to step S2601 shown in FIG. 26 via branching terminal A, in order to determine the distance. If the result of the determination in step S2509 is negative, the processing of step S2509 is repeated.

If the result of the determination in step S2507 is negative, the system is terminated because the input command is a command requesting the end of use of the system.

Figure 26:
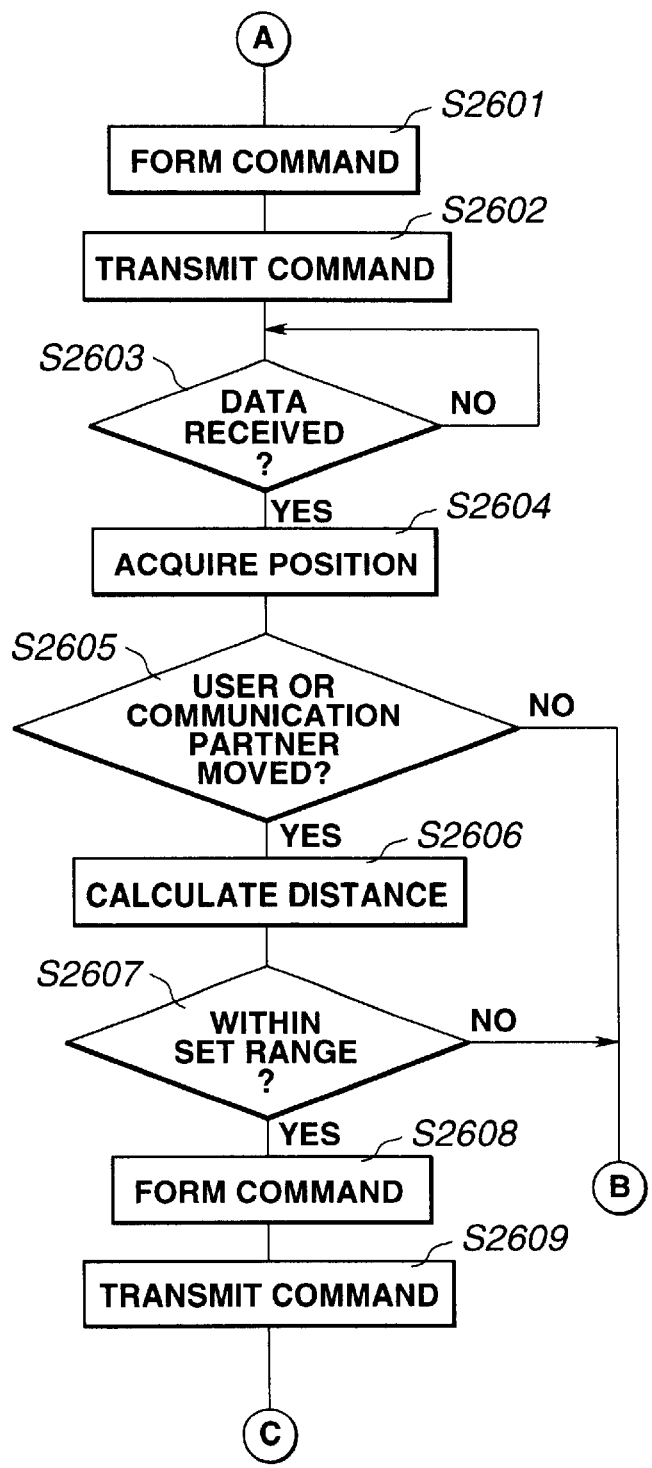

Next, a description will be provided of the process for determining the distance every time the time T has elapsed, with reference to FIG. 26.

First, in step S2601, a command used by the command forming unit 2402 for referring to the position information of the user himself and the communication partner from the position-information database 101 is formed. Then, in step S2602, the communication unit 2403 transmits a command for referring to the formed position information to the position-information database 101.

Then, in step S2603, it is determined if the communication unit 2403 has received the position information from the position-information database 101. The process of step S2603 is repeated until the data is received. If the position-information data has been received as a result of determination in step S2603, then, in step S2604, the database access unit 2406 acquires the position information of the user himself and the communication partner. At that time, the user ID acquired in steps S2504 and S2506 shown in. FIG. 25 is referred to from the memory 2407, to acquire the respective position information. The acquired position information is stored in the memory 2407.

Then, in step S2605, it is determined if the user or the communication partner has moved by comparing the acquired position information with the preceding position information stored in the memory 2407. If the result of the determination in step S2605 is negative, there is no change in the distance between the user and the communication partner. Hence, the process returns to step S2508 shown in FIG. 25 from branching terminal B in order to repeat the processing of determining the distance. The initial value is used as the preceding position information in the first comparison operation. The initial value is stored in the memory 2407 in step S2501 shown in FIG. 24. If the result of the determination in step S2605 is affirmative, the distance between the user and the communication partner is calculated.

Next, a description will be provided for the process of calculating the distance between the user and the communication partner from the position information of the two persons. Although various methods may be considered for this processing, four methods will be described in the third embodiment.

Figure 27:
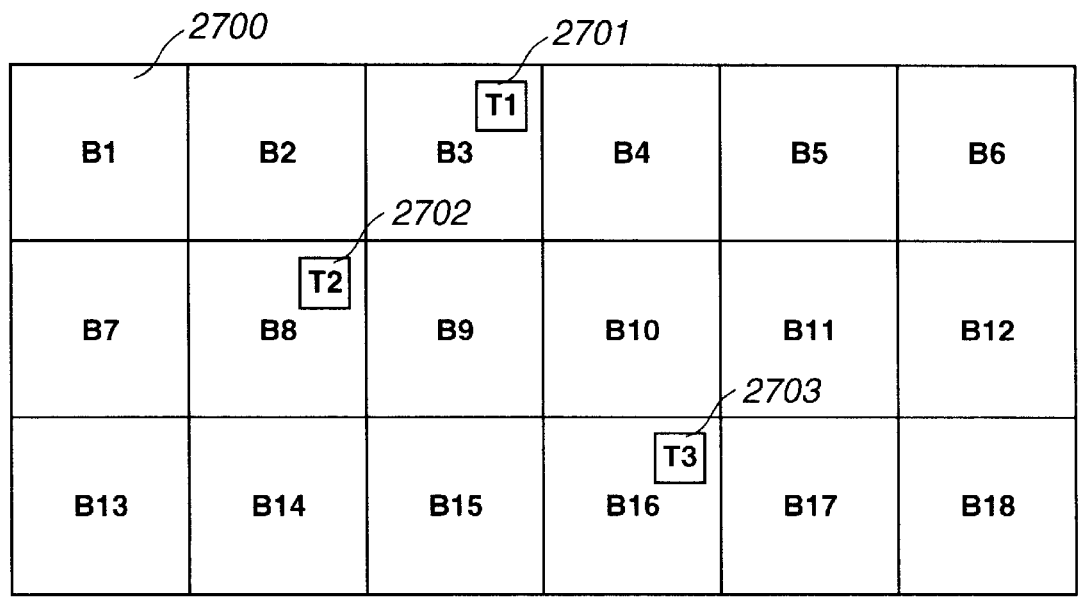
FIG. 27 is a diagram illustrating a first distance measuring method in the third embodiment.

First, a first method will be described with reference to FIG. 27. FIG. 27 illustrates a state in which locations where persons having tags (badges) are present are divided into blocks.

In FIG. 27, reference numeral 2700 represents a block B1 from among the divided blocks. Similarly, blocks B2, B3, . . . are shown. Each of reference numerals 2701–2703 represents a location where a tag (badge) is present. That is, in the case of FIG. 27, tags T1, T2 and T3 are present in blocks B3, B8 and B16, respectively, at a checked time.

At that time, if the communication partner is present in one of eight blocks adjacent to the block where the user is present, it can be assumed that the communication partner is present within an assigned range. If the tags T2 and T1 correspond to the user and the communication partner, respectively, it can be assumed that the communication partner is within the assigned range because he is in one of eight adjacent blocks as seen from the block B8 where the user is present.

This processing will be described with reference to FIG. 26. In step S2606, the blocks of the user and the communication partner are acquired based on the position information obtained in step S2604. Then, in step S2607, it is determined if the block of the communication partner is in one of eight blocks adjacent to the user's block. If the result of the determination in step S2607 is negative, the process returns to step S2508 shown in FIG. 25 via a branching terminal B in order to repeat the determination.

If the result of the determination in step S2607 is affirmative, the process proceeds to step S2608, where the command forming unit 2402 forms a command for notifying that the communication partner approaches. Then, in step S2609, the communication unit 2403 transmits the command to the sensor system 102. In the third embodiment, a speaker is incorporated in each tag (badge) so that a sound is generated by transmitting the command from the communication unit 2403 to the sensor system 102.

Upon completion of the process of step S2609, the process returns to step S2501 shown in FIG. 25 via branching terminal C in order to repeatedly execute the operation of the entire system.

Figure 28:
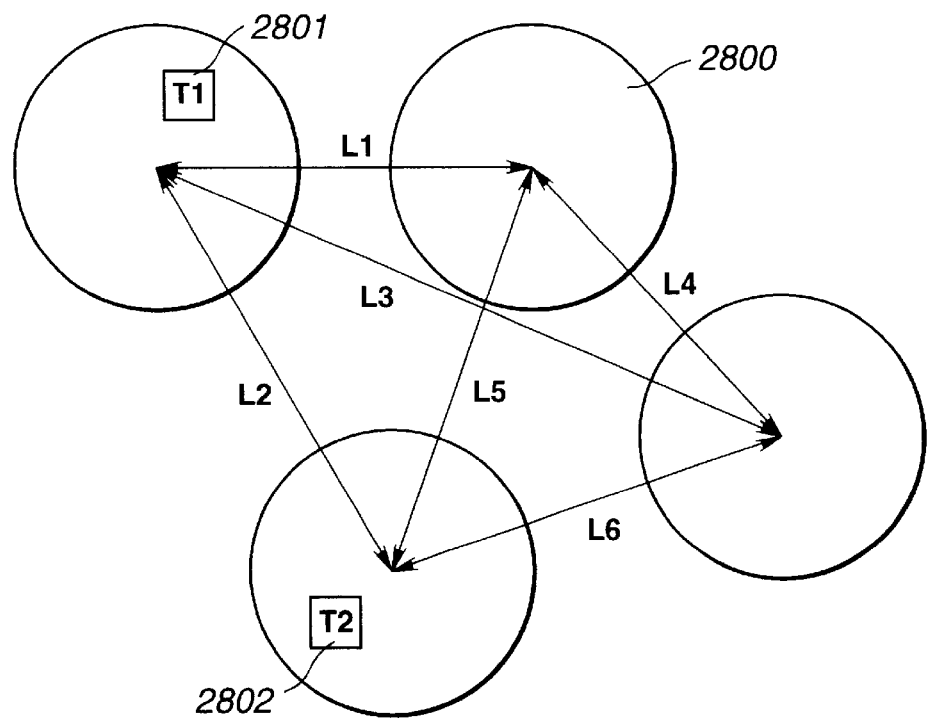
FIG. 28 is a diagram illustrating a second distance measuring method in the third embodiment.

Next, a second distance determining method will be described with reference to FIG. 28. In FIG. 28, reference numeral 2800 represents an effective range of a sensor of the sensor system 102. The center distance between such ranges is represented by L1 through L6. Each of reference numerals 2801 and 2802 represent a position where a tag is present. If the tag of the user is represented by T1 and the tag of the communication partner is represented by T2, the distance between the effective ranges of the sensors where the tags T1 and T2 are present is L2. By checking whether the distance L2 is longer or shorter than an assigned distance, it is possible to determine whether or not the communication partner is present within the assigned range.

Figure 29:
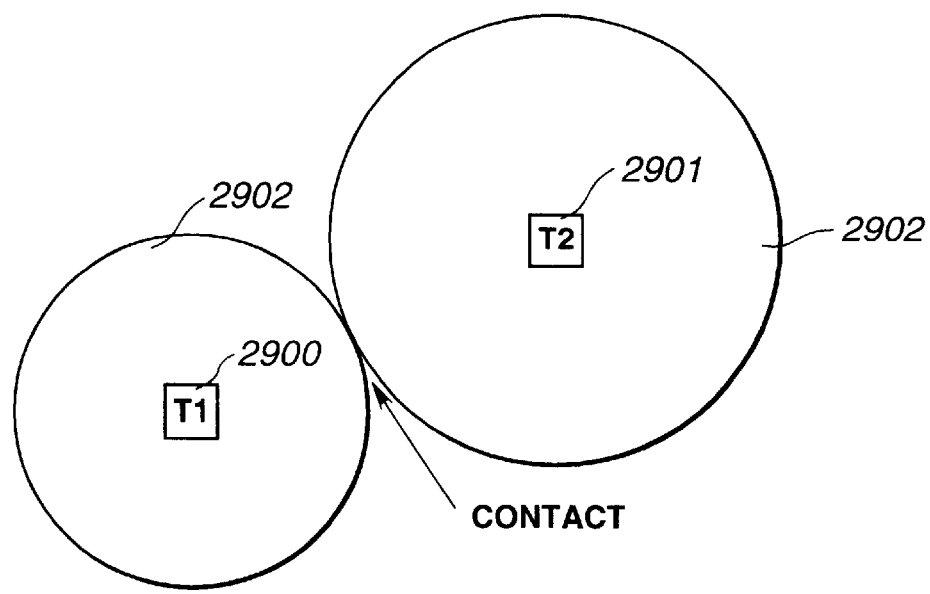
FIG. 29 is a diagram illustrating a third distance measuring method in the third embodiment.

Next, a third distance determining method will be described with reference to FIG. 29. In FIG. 29, reference numerals 2900 and 2901 represent tags (badges). Reference numeral 2902 represents an intensity of detection of each tag by a sensor. As the circle is larger, the intensity to react on a sensor is larger. In other words, this circle indicates the range of the possibility of the presence of the concerned tag. Accordingly, when the tags T1 and T2 move and reach the position where the two circles contact as shown in FIG. 29, it can be determined that the communication partner approaches the assigned range.

Figure 30:
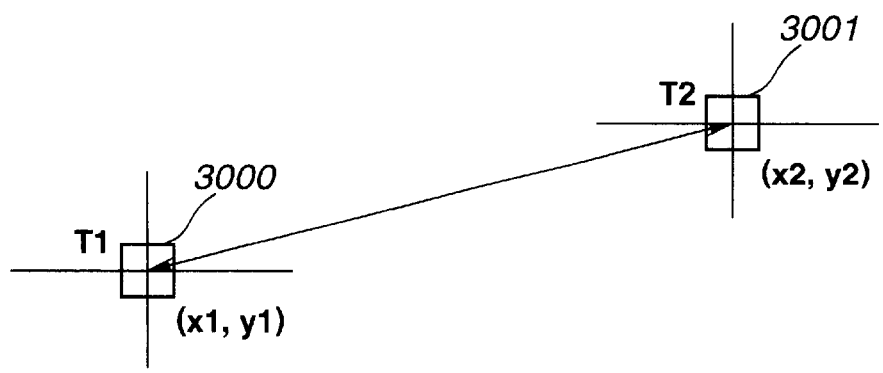
FIG. 30 is a diagram illustrating a fourth distance measuring method in the third embodiment.

Next, a fourth distance determining method will be described with reference to FIG. 30. In FIG. 30, reference numerals 3000 and 3001 represent tags (badges). If the positions of the tags T1 and T2 are represented by (x1, y1) and (x2, y2), respectively, the distance between the tags is obtained according to a formula for the distance between two points. If the calculated distance is shorter than an assigned distance, it can be determined that the communication partner is within the assigned range.

In each of the above-described distance determining methods, the positions of disposed sensors are controlled by a table as shown in FIG. 31. The contents of this table have been stored in advance in the external storage device 2408, and can be referred to whenever necessary. For example, in the second distance determining method, the distance between the sensors can be calculated using the formula for the distance between two points by referring to coordinate data in the table shown in FIG. 31.

In the determination of the distance, weight can be provided in accordance with the location where the communication partner is present. This is for preventing unconditional alarming (only by the determination of the distance) when the communication partner assists at an important conference. This can be realized by adding a virtual distance corresponding to the location where the communication partner is present to the obtained distance to the communication partner by referring to a table as shown in FIG. 32.

For example, if the distance to the communication partner is 30 and the distance within the assigned range is 50, and if the communication partner is in conference room 1, since the distance to be added is 10, 30+10=40 is the distance to the communication partner, so that it can be determined that the communication partner is within the assigned range. If the communication partner is in executive room 1, since the distance to be added is 100, 30+100=130 is the distance to the communication partner. It is therefore determined that the communication partner is not within the assigned range.

In calculating the distance, it is also possible to consider a case in which the user cannot move along a straight line, such as in an office. For such a case, for example, the layout of the office is input in advance as data, and the shortest path from the user to the person to contact is obtained. By using a movement-load table as shown in FIG. 33, the cost required for the movement along the shortest path is calculated. This cost is used as the distance to the person to contact.

Fourth Embodiment

Next, a fourth embodiment of the present invention will be described.

The fourth embodiment is realized by combining the first embodiment and the third embodiment, and provides a system in which both the relationship of a call and the distance between users are used for the determination of a call.

Figure 34:
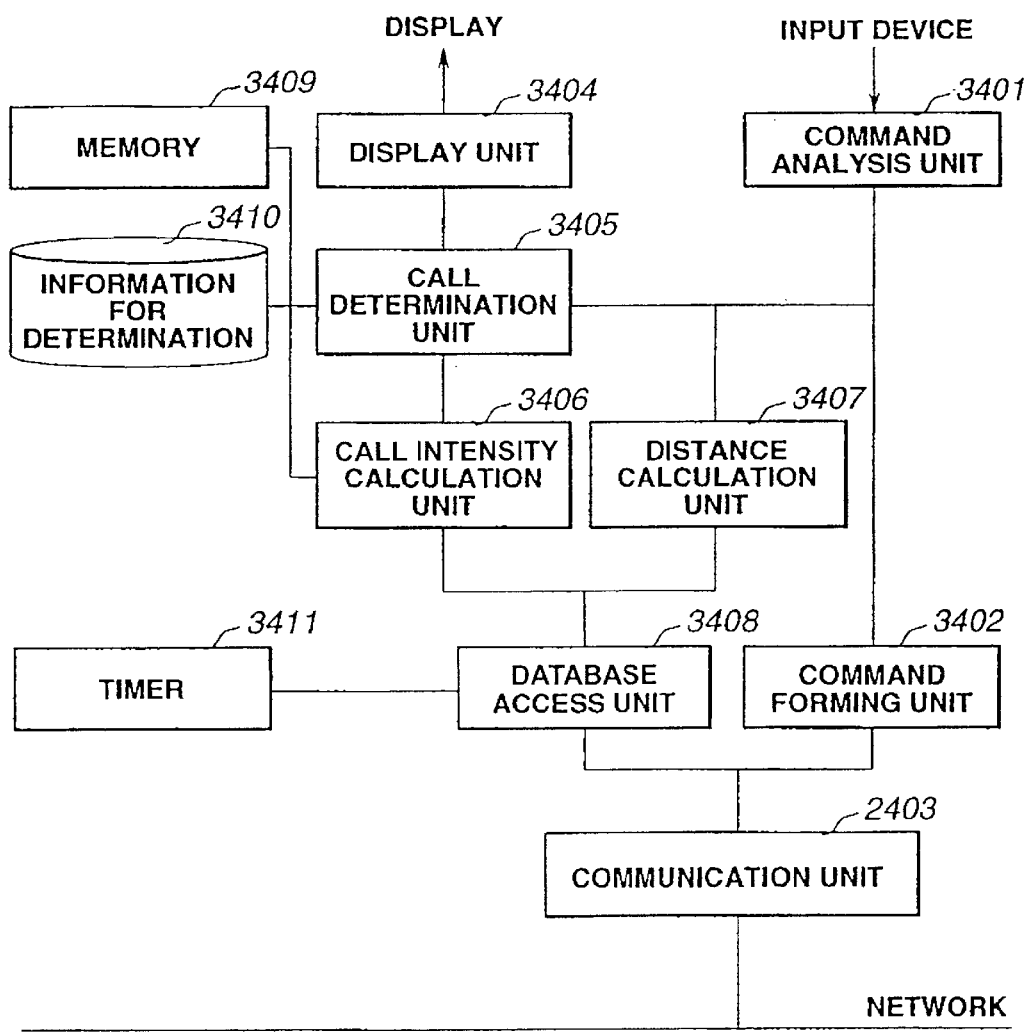
FIG. 34 is a block diagram illustrating the configuration of a system according to a fourth embodiment of the present invention.

FIG. 34 is block diagram illustrating the configuration of a system according to the fourth embodiment. The system includes a command analysis unit 3401, a command forming unit 3402, a communication unit 3403, a display unit 3404, a call determination unit 3405, a call-intensity calculation unit 3406, a distance calculation unit 3407, a database access unit 3408, a memory 3409, an external storage device. (information for determination) 3410, and a timer 3411.

As in the first and third embodiments, the contact supporting system of the fourth embodiment is also connected to the sensor system 102 and the position-information database 101 via the network shown in FIG. 2.

In FIG. 34, the command analysis unit 3401 is connected to an input device, such as a keyboard, a mouse or the like, and analyzes an input command. The command forming unit 3402 forms a command to instruct the sensor system 102 to output a sound from the concerned speaker.

The communication unit 3403 is connected to the network, and performs communication with the position-information database 101 or the sensor system 102. The display unit 3404 is connected to a display, and displays the contents of an output. The call determination unit 3405 determines whether or not the concerned person can be called, for example, based on the result of calculation of the call-intensity calculation unit 3406 and the distance calculation unit 3407.

The database access unit 3408 refers to data from the position-information database 101. The external storage device (information for determination) 3410 stores information relating to users utilizing the system and locations. The memory 3409 is used by the system for temporarily storing data. The timer 3411 controls time so that the database access unit 3408 periodically refers to position information.

The command analysis unit 3401, the command forming unit 3402, the call determination unit 3405 and the like are provided as a part of the function of a microprocessor (not shown) provided in the system. The operation shown in the following flowcharts is executed by a control program stored in a memory within the microprocessor. Such a control program of the microprocessor may be stored in advance in a storage medium, such as a hard disk, a floppy disk, a CD-ROM or the like, then may be set in a reader (not shown) of the system of the fourth embodiment, and may be read in the microprocessor.

Next, the operation of the system of the fourth embodiment will be described with reference to a flowchart.

The flow of the general processing of the entire system is basically the same as in the first and second embodiments. However, the fourth embodiment differs from the first and second embodiments in the process of determining a call (portions described with reference to FIGS. 5 and 23 in the first and second embodiments, respectively). Hence, this portion will be described in detail with reference to FIG. 35. Since processing in other portions is the same as in the first and second embodiments, further description thereof will be omitted.

Figure 35:
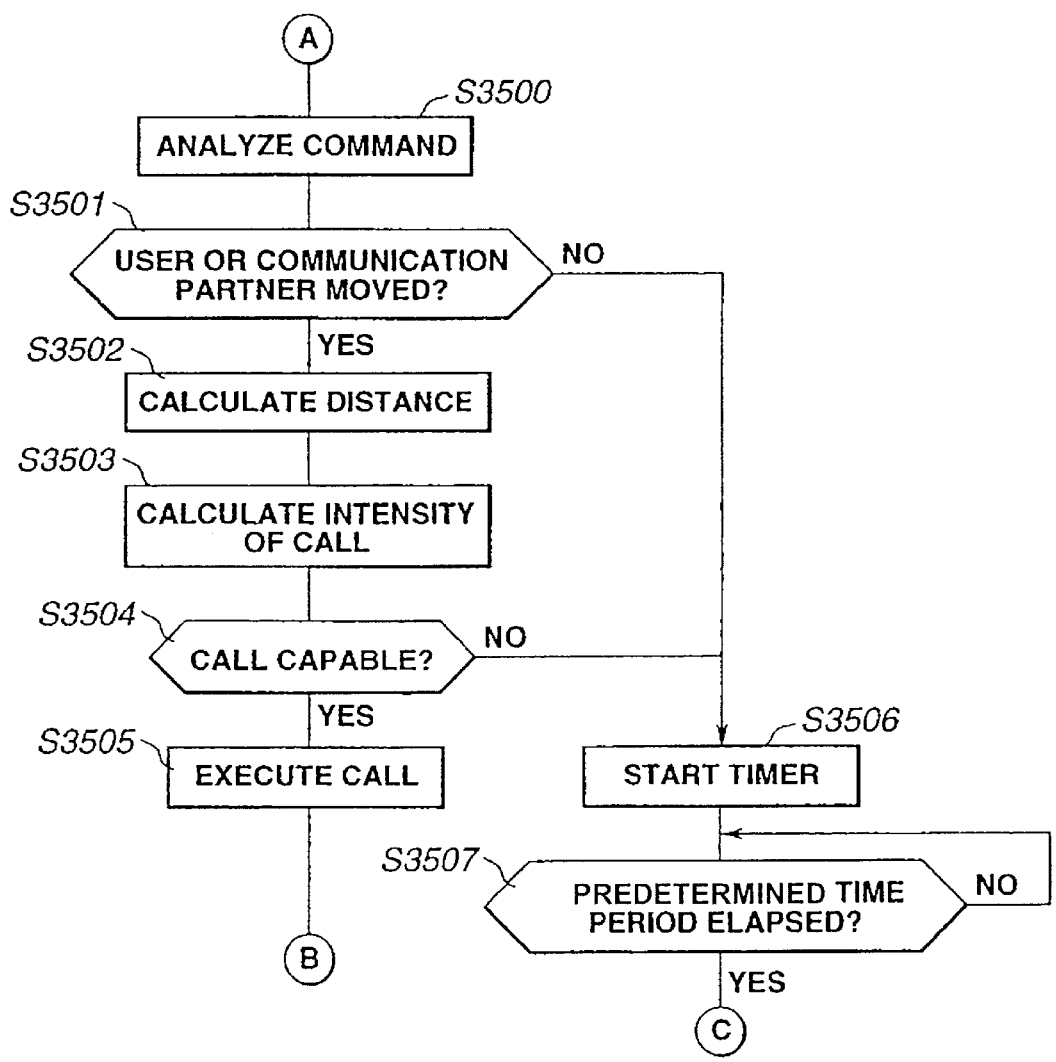
FIG. 35 is a flowchart illustrating the operation of the system of the fourth embodiment.

FIG. 35 is a flowchart illustrating the process of determining a call by receiving position-information data from the position-information database 101.

When the communication unit 3403 has received position-information data, then, in step S3500, the database access unit 3408 analyzes the received data. The position-information data obtained as the result of the analysis is stored in the memory 3409. Position information obtained from the position-information database 101 is a sensor ID. Then, in step S3501, it is determined if there is a change in the location of the user himself or the communication partner by comparing the position-information data stored in the memory 3409 in the preceding position-information receiving processed with the received position-information data. If the result of the determination in step S3501 is negative, the process proceeds to step S3506.

If the result of the determination in step S3501 is affirmative, the process proceeds to step S3502, where the distance between the user and the communication partner is calculated. The distance is calculated according to the method described in the third embodiment. The result of the calculation is stored in the memory 3409.

Then, in step S3503, the call-intensity calculation unit 3406 calculates the intensity of a call indicating the degree of the possibility of a call. The intensity is calculated according to the method described in the first embodiment. The result of the calculation is stored in the memory 3409.

Then, in step S3504, the call determination unit 3405 determines if a call can be performed. In the fourth embodiment, this determination is performed by comparing the distance value stored in step S3502 with the value indicated by the sum of the call intensity value stored in step S3503.

If the result of the determination in step S3504 is affirmative, the process proceeds to step S3505, where a call is executed. In the fourth embodiment, a command for outputting a sound from the speaker of the concerned tag (badge) is generated for the sensor system 102, and the command is transmitted to the sensor system 102. Upon completion of execution of a call, the process returns to the head of the main loop of the system of the fourth embodiment from branch B.

If the result of the determination in step S3504 is negative, the process proceeds to step S3506, where the timer 3411 is started. Then, in step S3507, it is determined if a predetermined time period has elapsed. If the result of the determination in step S3507 is affirmative, the process resumes the processing from the transmission of a command to request position information relating to the user and the communication partner, from branch C. Thus, the determination is repeated until the communication partner can be called.

Figures 36, 37:
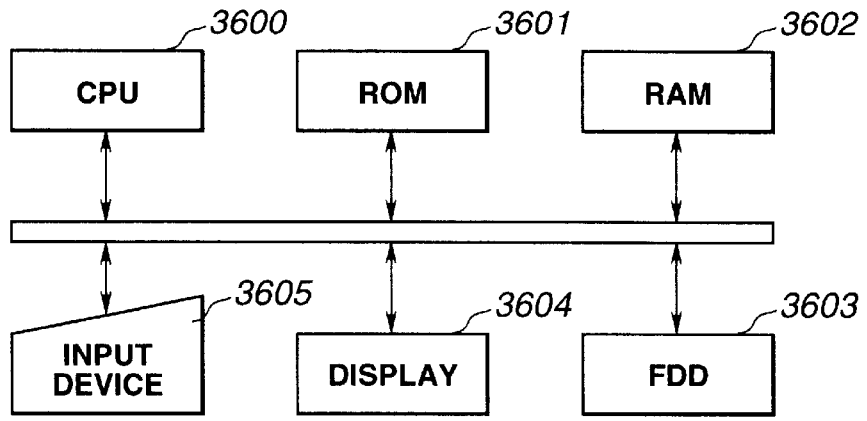
FIG. 36 is a diagram illustrating the configuration of the hardware of a computer terminal which executes any one of the first through fourth embodiments.
FIG. 37 is a diagram illustrating a memory map of a storage medium which stores respective modules for executing the third embodiment.

Each of the foregoing embodiments can also be realized by providing a computer terminal connected to the network with a program. FIG. 36 illustrates the configurations of computer terminals.

In FIG. 36, a CPU 3600 performs various kinds of control for a RAM 3602, an input device 3605, a display 3604 and an FDD (floppy-disk drive) 3603 in accordance with programs stored in a ROM 3601. The ROM 3601 stores various kinds of programs for processing data input from the input device 3605 and executing processing of the CPU 3600, as well as programs for executing the operation of the system executed under the control of the CPU 3600.

The RAM 3602 is used to provide operating regions for various kinds of programs and data input from the input device 3605 as well as to provide temporary storage regions. The FDD 3603 mounts FD's (floppy disks, not shown), where data can be read and written. It is also possible to execute processing by writing a program in the mounted FD and reading the program into the RAM 3602. In each of the foregoing embodiments, the above-described processing is performed after storing a program in the ROM 3601 and reading the program from the ROM 3601 into the RAM 3602 under the control of the CPU 3600.

It is also possible to execute processing by providing a CD-ROM drive or an HDD (hard-disk drive) instead of the FDD 3603, storing the above-described program in a CD-ROM or an HD (hard disk) mounted or incorporated in the corresponding drive, and reading the stored program.

The objects of the present invention may also be achieved by supplying a system or an apparatus with a storage medium storing program codes of software for realizing the functions of the above-described embodiments, and reading and executing the program codes stored in the storage medium by means of a computer (or a CPU or an MPU (microprocessor unit)) of the system or the apparatus.

In such a case, the program codes themselves read from the storage medium realize the functions of the above-described embodiments, so that the storage medium storing the program codes constitutes the present invention. For example, a floppy disk, a hard disk, an optical disk, a magnetooptical disk, a CD-ROM, a CD-R (recordable), a magnetic tape, a nonvolatile memory card, a ROM or the like may be used as the storage medium for supplying the program codes.

The present invention may be applied not only to a case in which the functions of the above-described embodiments are realized by executing program codes read by a computer, but also to a case in which an OS (operating system) or the like operating in a computer executes a part or the entirety of actual processing, and the functions of the above-described embodiments are realized by the processing.

The present invention may also be applied to a case in which, after writing program codes read from a storage medium into a memory provided in a function expanding card inserted into a computer or in a function expanding unit connected to the computer, a CPU or the like provided in the function expanding card or the function expanding unit performs a part or the entirety of actual processing by the instructions of the program codes. The functions of the above-described embodiments are realized through this processing.

When applying the present invention to the storage medium, program codes corresponding to the above-described flowcharts are stored in the storage medium. More specifically, for example, in the third embodiment, respective modules illustrated in a memory map shown in FIG. 37 are stored in the storage medium.

That is, in the third embodiment, program codes of respective modules, such as code for an input process of receiving and interpreting inputs of a command and a user's name, code for a display process of displaying the contents received from the input process, code for a communication process of performing communication with the position sensor system, code for a position acquiring process of acquiring position information of a user assigned from the position sensor system, code for a first storage process of storing information relating to users and locations in the memory, code for a second storage process of storing information received from the input process in the memory, code for a distance acquiring process of calculating the distance between users based on the information stored in the first storage process, the information stored in the second storage process, and the information acquired in the position acquiring process, code for a distance determination process of detecting that the communication partner has approached based on the distance information acquired in the distance acquiring process, code for a retrying process of repeating the position acquiring process and the distance determination process until the communication partner approaches, and code for a notification process of notifying that the communication partner has approached when the distance determination process has determined that the communication partner has approached, may be stored in the storage medium.

As described above, according to the present invention, it is possible to perform a call considering the location of the owner of a communication apparatus, the degree of emergency when calling the owner of the communication apparatus, and the like.

According to the present invention, it is possible to determine whether or not a call can be performed based on information relating to a partner to be called, information relating the assigned degree of emergency, and position information of the partner to be called. When a call can be performed, a call is executed. When a call cannot be performed, the contents are displayed. Hence, it is possible to perform a call in accordance with information relating to the location of the communication partner. It is also possible to prevent a forced call for a communication partner for whom a call is prohibited, and to prevent a decrease in the efficiency of the operation due to the interruption caused by a call.

When it has been determined that the possibility of a call is uncertain, by outputting a dialog to urge the user to perform a confirmation, it is possible to perform a call with more precision, to improve the certainty of a call, and to increase the efficiency of the operation.

When a call cannot be performed, processing of determining a call is repeated at every time interval set by a timer. Hence, it is unnecessary for the user to repeatedly perform assignment for a call, a call can be assuredly performed, and the efficiency of the operation can be increased.

It is also possible to perform a call in consideration of the distance to the person to contact, and to notify that the person to contact is present nearby.

When it has been determined that the person to contact is present nearby based on distance information, the user is notified of the fact. Hence, each user can know the location of the communication partner. Furthermore, since each user can know the location of the communication partner, a chance to easily meet the communication partner can be appropriately obtained. Hence, the efficiency of the operation of meeting the communication partner can be increased.

It is determined if a partner to be called can be called based on the information relating to the partner, information relating to the assigned degree of emergency, and position information of the partner, and the distance to the partner is calculated based on the position information relating to the user and the partner. When the distance to the partner is small and it has been determined that a call can be performed, a call is executed. Hence, it is possible to assuredly call a communication partner present nearby under an exact determination, and to perform a call more smoothly. As a result, the efficiency of the operation can be increased.

The individual components shown in outline or designated by blocks in the drawings are all well-known in the communication system and apparatus arts, and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A communication system including a portable communication apparatus, said system comprising:
   position discrimination means for discriminating position information,
   wherein said position information relates to a position of the portable communication apparatus, with which communication is requested by another communication apparatus,
   wherein said position information is usable to control whether or not to permit communication with the portable communication apparatus, and
   wherein, for each possible of said position information, at least one criteria is preset which determines whether or not to permit communication with said portable communication apparatus; and
   control means for automatically controlling whether or not to permit communication with the portable communication apparatus in accordance with said position information and at least one of said criteria.

2. A communication system according to claim 1, wherein levels are assigned to each of the portable communication apparatus and the other communication apparatus, and said control means performs the controlling in accordance with the levels of the portable communication apparatus and the other communication apparatus.

3. A communication system according to claim 1, further comprising:
   degree-of-emergency assigning means for assigning a degree of emergency indicating an urgency of a particular call request,
   wherein said control means performs the controlling in accordance with the degree-of-emergency assigned by said degree-of-emergency assigning means.

4. A communication system according to claim 3, wherein levels are assigned to each of the portable communication apparatus and the other communication apparatus, and said control means performs the controlling in accordance with the levels of the portable communication apparatus and other communication apparatus.

5. A communication system according to claim 1, wherein said control means makes the portable communication apparatus instruct whether a call should be performed or not.

6. A communication system according to claim 1, wherein said position discrimination means calculates the distance between the portable communication apparatus and the other communication apparatus from the position information discriminated.

7. A communication system according to claim 1, wherein said position discrimination means discriminates the position information of the portable communication apparatus periodically until the call of the portable communication apparatus is performed by said control means.

8. A communication system according to claim 1, wherein the position detection means is connected to said communication system via a network.

9. A communication unit capable of acquiring a position of a portable communication apparatus, said unit comprising:
   position discrimination means for discriminating position information, wherein said position information relates to a position of the portable communication apparatus, with which communication is requested by another communication apparatus, wherein said position information is usable to control whether or not to permit communication with the portable communication apparatus, and wherein, for each possible of said position information, at least one criteria is preset which determines whether or not to permit communication with said portable communication apparatus; and control means for automatically controlling whether or not to permit communication with the portable communication apparatus in accordance with said position information and at least one of said criteria.

10. A communication unit according to claim 9, wherein levels are assigned to each of the portable communication apparatus and the other communication apparatus, and said control means performs the controlling in accordance with the levels of the portable communication apparatus and the other communication apparatus.

11. A communication unit according to claim 9, further comprising:

degree-of-emergency assigning means for assigning a degree of emergency indicating an urgency of a particular call request, wherein said control means performs the controlling in accordance with the degree of emergency assigned by said degree-of-emergency assigning means.

12. A communication unit according to claim 11, wherein levels are assigned to each of the portable communication apparatus and the other communication apparatus, and said control means performs the controlling in accordance with the levels of the portable communication apparatus and the other communication apparatus.

13. A communication unit according to claim 9, wherein said control means makes the portable communication apparatus instruct whether a call should be performed or not.

14. A communication unit according to claim 9, wherein said position discrimination means calculates the distance between the portable communication apparatus and the other communication apparatus from the position information discriminated.

15. A communication unit according to claim 9, wherein said position discrimination means discriminates the position information of the portable communication apparatus periodically until the call of the portable communication apparatus is performed by said control means.

16. A method for controlling a communication including a portable communication apparatus, said method comprising:

a position discrimination step of discriminating position information, wherein said position information relates to a position of the portable communication apparatus, with which communication is requested by another communication apparatus, wherein said position information is usable to control whether or not to permit communication with the portable communication apparatus, and wherein, for each possible of said position information, at least one criteria is preset which determines whether or not to permit communication with said portable communication apparatus; and a control step of automatically controlling whether or not to permit communication with the portable communication apparatus in accordance with said position information and at least one of said criteria.

17. A method of controlling a communication unit capable of acquiring a position of a portable communication apparatus, said method comprising:

a position discrimination step of discriminating position information, wherein said position information relates a position of the portable communication apparatus, with which communication is requested by another communication apparatus, wherein said position information is usable to control whether or not to permit communication with the portable communication apparatus, and wherein, for each possible of said position information, at least one criteria is preset which determines whether or not to permit communication with said portable communication apparatus; and a control step of automatically controlling whether or not to permit communication with the portable communication apparatus in accordance with said position information and at least one of said criteria.

18. A storage medium which can be read by a computer and which stores a program for controlling a communication unit capable of acquiring a position of a portable communication apparatus, said program comprising:

a position discrimination step of discriminating position information, wherein said position information relates to a position of the portable communication apparatus, with which communication is requested by another communication apparatus, wherein said position information is usable to control whether or not to permit communication with the portable communication apparatus, and wherein, for each possible of said position information, at least one criteria is preset which determines whether or not to permit communication with said portable communication apparatus; and a control step of automatically controlling whether or not to permit communication with the portable communication apparatus in accordance with said position information and at least one of said criteria.

19. A communication unit configured to communicate with a first communication apparatus, said unit comprising:

reception means for receiving a designation of a second communication apparatus from the first communication apparatus;

position discrimination means for discriminating position information, wherein said position information relates to a position of the second communication apparatus designated by the designation received by said reception means, wherein said position information is usable to control whether or not to permit communication with the portable communication apparatus, and wherein, for each possible of said position information, at least one criteria is preset which determines whether or not to permit communication with said portable communication apparatus; and control means for automatically controlling whether or not to permit notification of the first communication apparatus in accordance with said position information and at least one of said criteria.

20. A communication unit according to claim 19, wherein said position detection means detects the position information of the first communication apparatus, and said control means performs said control in accordance with the relation of the positions of the first communication apparatus and the second communication apparatus discriminated from the position information detected by said position detection means.

21. A communication system according to claim 20, wherein said relation of the positions is the distance between the first communication apparatus and the second communication apparatus.

22. A communication system according to claim 20, wherein said relation to the positions is information of the route between the first communication apparatus and the second communication apparatus.

23. A communication system according to claim 19, wherein said position detection means detects the position of the second communication apparatuses periodically until the call to the first communication apparatus is performed by said control means.

24. A communication system according to claim 19, wherein the notification is a one of sound and vibration.

25. A method for controlling a communication unit configured to communicate with a first communication apparatus, said method comprising:

a reception step of receiving a designation of a second communication apparatus from the first communication apparatus;

a position discrimination step of discriminating position information, wherein said the position information relates to a position of the second communication apparatus designated by the designation received in said reception step, wherein said position information is usable to control whether or not to notify the first communication apparatus, and wherein, for each possible of said position information, at least one criteria is preset which determines whether or not to permit communication with said second communication apparatus; and a control step of automatically controlling whether or not to permit notification of the first communication apparatus in accordance with said position information and at least one of said criteria.

26. A communication system according to claim 25, wherein the notification is a one of sound and vibration.

27. A communication unit configured to communicate with a storage medium which can be read by a computer and which stores a program for a first communication apparatus, said unit comprising:

a reception step of receiving a designation of a second communication apparatus from the first communication apparatus;

a position discrimination step of discriminating position information, wherein said position information relates to a position of the second communication apparatus designated by the designation received in said reception step, wherein said position communication is usable to control whether or not to notify the first communication apparatus, and wherein, for each possible of said position information, at least one criteria is preset which determines whether or not to permit communication with said second communication apparatus; and a control step of automatically controlling whether or not to permit notification of the first communication apparatus in accordance with said position information and at least one of said criteria.

28. A communication system according to claim 27, wherein the notification is a one of sound and vibration.

* * * * *

UNITED STATES PATENT AND TRADEMARK OFFICE
CERTIFICATE OF CORRECTION

PATENT NO.   : 6,700,966 B2　　　　　　　　　　　　　　　　　　　　　　　　　　Page 1 of 1
DATED        : March 2, 2004
INVENTOR(S)  : Takagi et al.

It is certified that error appears in the above-identified patent and that said Letters Patent is hereby corrected as shown below:

<u>Title page,</u>
Item [*] Notice, delete the phrase "by 101 days" and insert -- by 0 days --

Signed and Sealed this

Twenty-eighth Day of September, 2004

JON W. DUDAS
*Director of the United States Patent and Trademark Office*